United States Patent
Kurosawa et al.

(10) Patent No.: US 10,084,400 B2
(45) Date of Patent: Sep. 25, 2018

(54) MOTOR DRIVING DEVICE AND MOTOR SYSTEM

(71) Applicant: Renesas Electronics Corporation, Tokyo (JP)

(72) Inventors: Minoru Kurosawa, Kodaira (JP); Kichiya Itagaki, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/266,936

(22) Filed: Sep. 15, 2016

(65) Prior Publication Data
US 2017/0126155 A1    May 4, 2017

(30) Foreign Application Priority Data
Oct. 29, 2015    (JP) .................................. 2015-212484

(51) Int. Cl.
| H02P 6/18 | (2016.01) |
| H02P 21/22 | (2016.01) |
| G11B 19/20 | (2006.01) |
| H02P 27/08 | (2006.01) |
| H02P 6/182 | (2016.01) |

(52) U.S. Cl.
CPC .............. *H02P 6/182* (2013.01); *G11B 19/20* (2013.01); *G11B 19/2054* (2013.01); *G11B 19/2072* (2013.01); *H02P 21/22* (2016.02); *H02P 27/08* (2013.01)

(58) Field of Classification Search
CPC ...................................................... H02P 6/182

USPC ........................................................ 318/400
See application file for complete search history.

(56) References Cited

U.S. PATENT DOCUMENTS

| 7,088,063 B2 | 8/2006 | Kurosawa et al. |
| 9,070,856 B1* | 6/2015 | Rose ...................... H01L 41/042 |
| 2006/0158142 A1* | 7/2006 | Kurosawa .............. G11B 19/28 |
| | | 318/400.35 |
| 2007/0114951 A1* | 5/2007 | Tsen .................... H05B 33/0818 |
| | | 315/291 |

(Continued)

FOREIGN PATENT DOCUMENTS

| JP | 2005-102447 A | 4/2005 |
| JP | 2010-288396 A | 12/2010 |

Primary Examiner — Eduardo Colon Santana
Assistant Examiner — Devon Joseph
(74) Attorney, Agent, or Firm — McGinn IP Law Group, PLLc.

(57) ABSTRACT

The phase of a drive current of a motor is optimized. The phase arithmetic unit PHCAL calculates a drive voltage phase θdrv to converge the phase difference between the reference voltage phase θbemf and the reference current phase θi to zero based on a prescribed arithmetic expression. The phase correction unit PHCP determines the phase θdrvR after the correction by adding a correction value to the phase θdrv, and the magnitude of the correction value is updated by a feedback control so as to converge to a prescribed value the phase difference between the reference voltage phase θbemf and the reference current phase θi which are inputted. A PWM controller shifts an energization control timing synchronized with the reference voltage phase θbemf based on the corrected phase θdrvR, and generates the PWM signal for controlling the drive voltage to a sine wave shape.

22 Claims, 20 Drawing Sheets

(56) References Cited

U.S. PATENT DOCUMENTS

| | | | |
|---|---|---|---|
| 2007/0125771 A1* | 6/2007 | Uchida | A45D 20/12 219/662 |
| 2007/0194730 A1* | 8/2007 | Fukamizu | H02P 6/182 318/400.09 |
| 2007/0194731 A1* | 8/2007 | Fukamizu | H02P 6/182 318/400.09 |
| 2007/0216325 A1* | 9/2007 | Fukamizu | H02P 6/182 318/400.34 |
| 2007/0229004 A1* | 10/2007 | Fukamizu | G11B 19/2054 318/400.26 |
| 2009/0003022 A1* | 1/2009 | Nunoya | B60L 5/005 363/78 |
| 2009/0058331 A1* | 3/2009 | Aoyagi | H02M 7/53873 318/255 |
| 2011/0043147 A1* | 2/2011 | Lin | H02P 6/06 318/400.06 |
| 2011/0219816 A1* | 9/2011 | Tanaka | H02P 6/18 62/498 |
| 2011/0266992 A1* | 11/2011 | Nishiguchi | B60L 11/123 318/807 |
| 2011/0279070 A1* | 11/2011 | Tanaka | H02P 6/181 318/400.1 |
| 2013/0069572 A1* | 3/2013 | Maekawa | H02P 6/18 318/400.14 |
| 2013/0197761 A1* | 8/2013 | Ueda | B62D 5/046 701/42 |
| 2013/0307452 A1* | 11/2013 | Sonoda | H02P 6/18 318/400.32 |
| 2014/0035501 A1* | 2/2014 | Harada | H02P 6/16 318/400.35 |
| 2014/0159632 A1* | 6/2014 | Kim | H02P 6/18 318/400.34 |
| 2014/0225546 A1* | 8/2014 | Sato | H02P 6/10 318/400.26 |
| 2015/0002062 A1* | 1/2015 | Kim | H02P 6/16 318/400.07 |
| 2016/0156294 A1* | 6/2016 | Heo | H02P 6/182 318/400.34 |
| 2016/0377435 A1* | 12/2016 | Ono | G01C 19/5726 73/504.12 |
| 2017/0110998 A1* | 4/2017 | Tanaka | H02P 6/08 |

\* cited by examiner

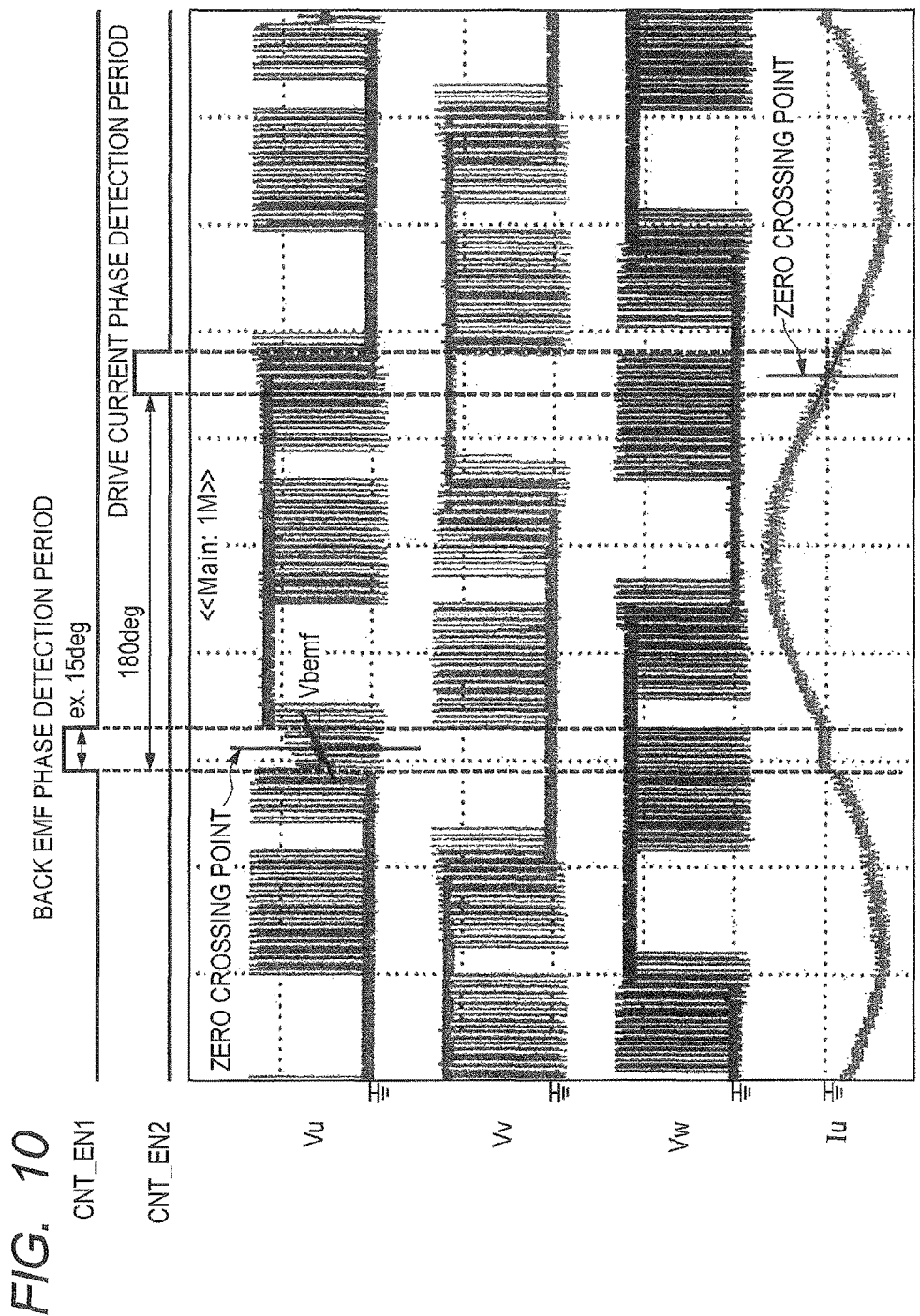

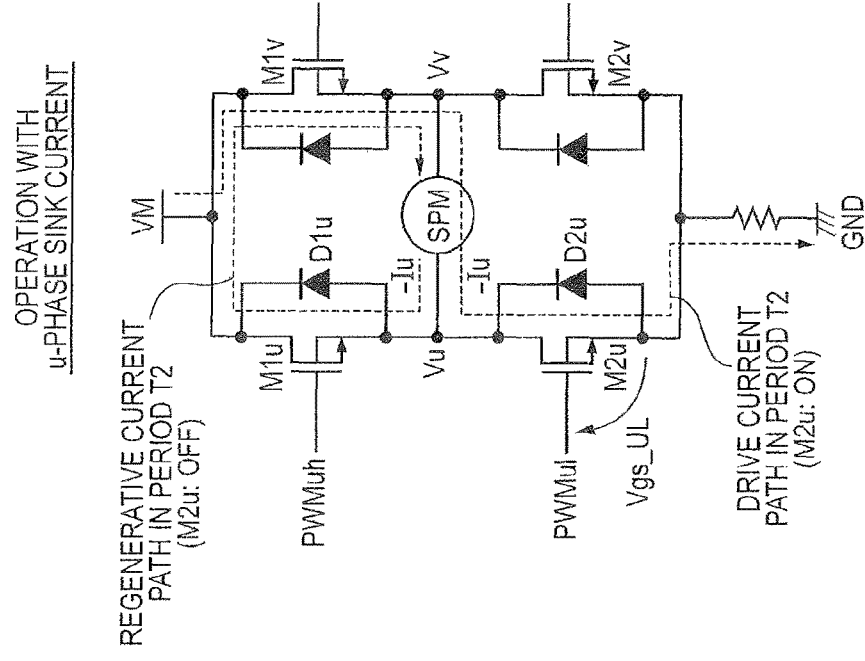
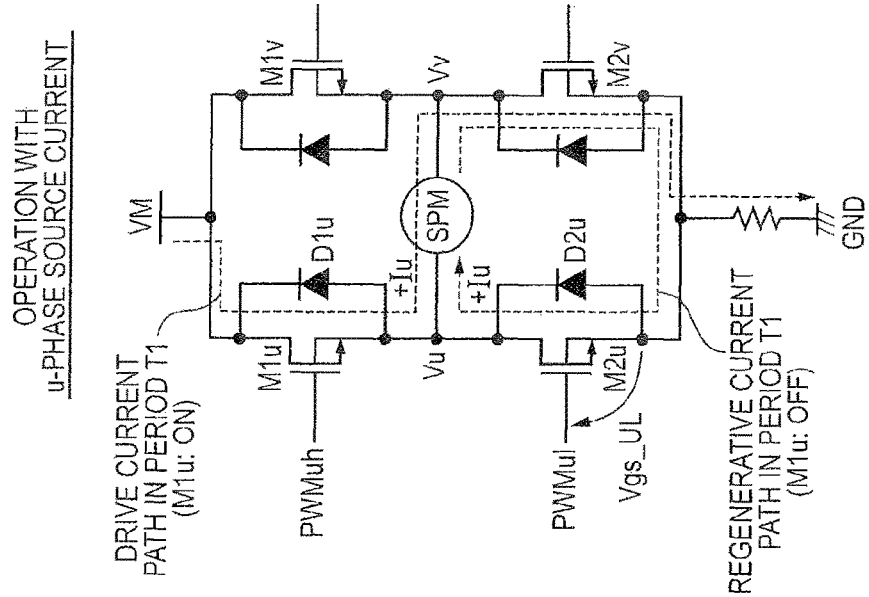

MOTOR DRIVING DEVICE AND MOTOR SYSTEM

CROSS-REFERENCE TO RELATED APPLICATIONS

The disclosure of Japanese Patent Application No. 2015-212484 filed on Oct. 29, 2015 including the specification, drawings and abstract is incorporated herein by reference in its entirety.

BACKGROUND

The present invention relates to a motor driving device and a motor system, and relates to the technology which is useful for adjusting the phase of a drive current of a motor as an example.

Patent Literature 1, for example, discloses a system to calculate the phase of a drive voltage of a motor based on an arithmetic expression which employs an angular frequency, a drive current value, and characteristic constants (a torque constant and an impedance value) of the motor. Patent Literature 2 discloses a system in which one of the phase of a back electromotive force and the phase of a drive current is selected to control the energization timing of a motor.

(Patent Literature 1) Japanese Unexamined Patent Application Publication No. 2010-288396

(Patent Literature 2) Japanese Unexamined Patent Application Publication No. 2005-102447

SUMMARY

In order to drive a motor with a high degree of efficiency, it is necessary to make a drive current flow through a motor in an optimal phase. The drive current of the motor is actually generated by applying a drive voltage to the motor. Therefore, in order to optimize the phase of the drive current, it is necessary to optimize the phase of the drive voltage. The optimal phase of the drive voltage can be calculated based on an arithmetic expression using an angular frequency, a drive current value, and a characteristic constant of the motor, for example, as shown in Patent Literature 1.

Here, the characteristic constant of a motor is determined for each kind of motors, for example. However, even if a motor of the same kind is used, there is a possibility that variations in the characteristic constant resulting from manufacturing variations for example may occur in each motor. Even if a single motor is referred to as a target, there is a possibility that variations in the characteristic constant may occur in chronological order due to time degradation. When the variations in the characteristic constant occur, the efficiency of the motor decreases, and the consumption current for maintaining a constant rotation increases correspondingly.

The present invention described by the following embodiments has been accomplished in view of the above, and the other issues and new features of the present invention will become clear from the description of the present specification and the accompanying drawings.

A motor driving device according to one embodiment is provided with a drive voltage phase generator which determines a first phase used as a phase of a drive voltage. The first phase is necessary to set to a prescribed value the phase difference between the reference voltage phase used as the phase of a back electromotive force of a motor and the reference current phase used as the phase of a drive current. The drive voltage phase generator includes a phase arithmetic unit and a phase correction unit. The phase arithmetic unit calculates a second phase used as a phase of the drive voltage to reduce the phase difference between the reference voltage phase and the reference current phase to zero substantially, based on a prescribed arithmetic expression. The phase correction unit determines the first phase by adding a correction value to the second phase, and inputs the reference voltage phase and the reference current phase to update the magnitude of the correction value by a feedback control so as to converge the phase difference to the prescribed value. The PWM controller shifts an energization control timing synchronized with the reference voltage phase based on the first phase, and generates a PWM signal to control the drive voltage to a sine wave shape.

According to one embodiment described above, it is possible to optimize the phase of the drive current of the motor.

BRIEF DESCRIPTION OF THE DRAWINGS

FIG. 10 is a waveform chart illustrating an example of the detection period of a rotational position detector illustrated in FIG. 6;

FIG. 15A is an explanatory drawing illustrating an example of operation of an inverter at the time of source current in FIG. 14;

FIG. 15B is an explanatory drawing illustrating an example of operation of the inverter at the time of sink current in FIG. 14;

DETAILED DESCRIPTION

The following embodiment is explained by being split to several sections or embodiments when it is necessary for convenience. However, except when specified clearly in particular, the divided sections or embodiments are not mutually unrelated, however, one is regarded as a modified example, details, or a supplementary explanation of some or all of the other. When the number of elements (including the number, a numerical value, an amount, a range) are referred to in the following embodiment, it is not always restricted to the specific number of elements but it may be more or less than the specific number, except when it is specified clearly and when it is theoretically and clearly restricted to a specific number.

In the following embodiment, it is needless to say that the component (including an element step) is not necessarily indispensable except when it is specified clearly and when it is theoretically thought that it is clearly indispensable. Similarly, in the following embodiment, when describing the form, positional relationship, etc., of a component, etc., what resembles to or is substantially similar to the form, etc. shall be included, except when it is clearly specified and when it is considered theoretically that it is not so. Same applies to the numerical value and the range.

Although not restricted in particular, a circuit element that configures each functional block of the embodiments is formed on a semiconductor substrate such as single crystal silicon by employing the well-known CMOS (complementary MOS transistor) integrated circuits technology.

Hereinafter, the embodiment of the present invention is described in detail, with reference to the drawings. In the entire diagrams to explain the embodiments of the present invention, the same symbol is attached to the same element in principle, and the repeated explanation thereof is omitted.

Embodiment 1

«Outline of a Motor System»

Figure 1:
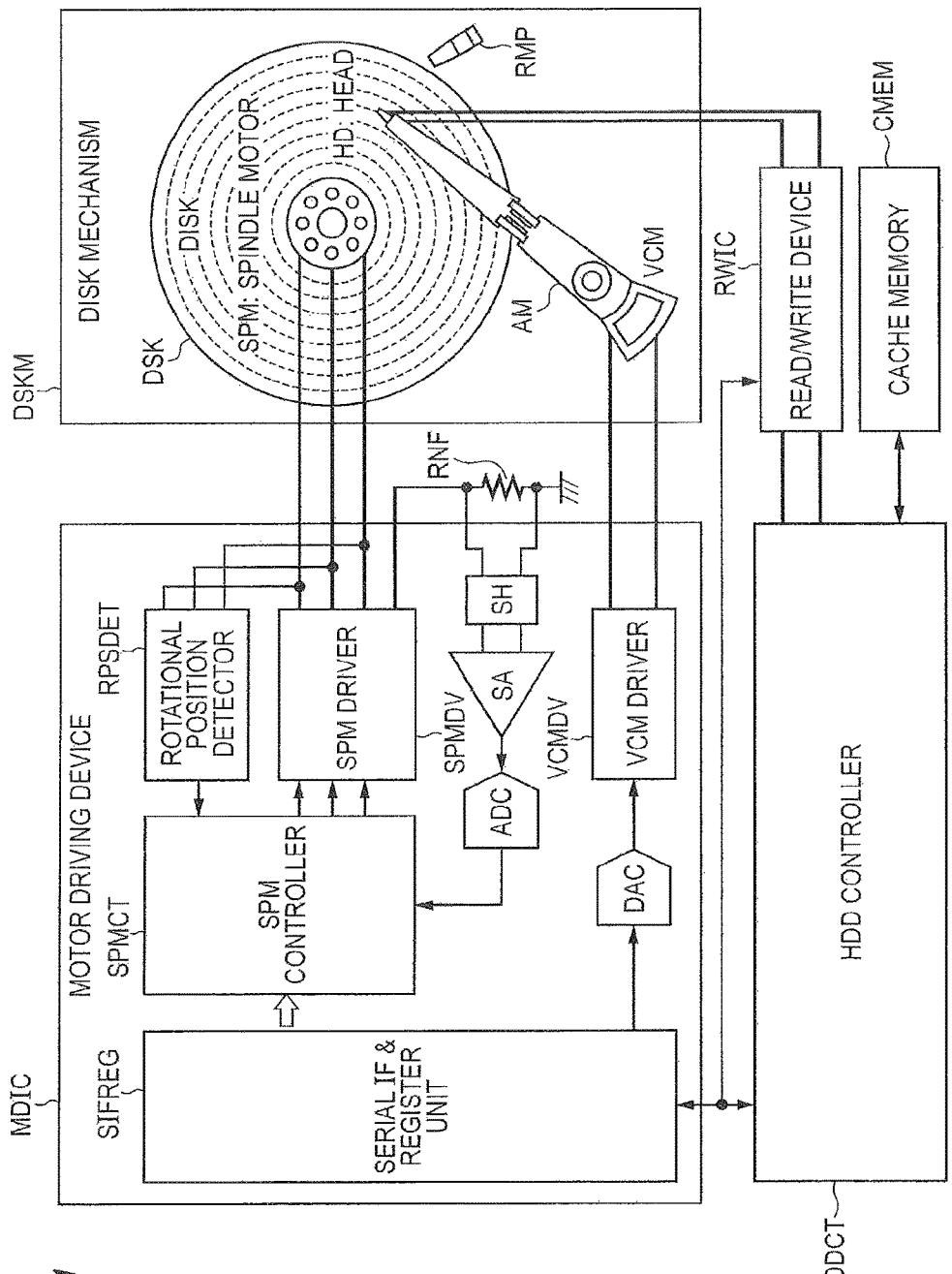
FIG. 1 is a functional block diagram illustrating an example of the outline configuration of a motor system according to Embodiment 1 of the present invention.

FIG. 1 is a functional block diagram illustrating an example of the outline configuration of a motor system according to Embodiment 1 of the present invention. FIG. 1 illustrates an example of the configuration of a hard disk device (hereinafter abbreviated as an HDD device), as an example of the motor system. The HDD device illustrated in FIG. 1 includes an HDD controller HDDCT, a cache memory CMEM, a read/write device RWIC, a motor driving device MDIC, and a disk mechanism DSKM. The HDD controller HDDCT is comprised of a system on a chip (SoC) which includes a processor, for example. The cache memory CMEM and the read/write device RWIC are comprised of respectively different semiconductor chips, for example.

The disk mechanism DSKM includes a disk (here a hard disk) DSK, a spindle motor (hereinafter abbreviated as a motor) SPM, a head HD, an arm mechanism AM, a voice coil motor VCM, and a ramp mechanism RMP. The motor SPM rotates the disk DSK. The voice coil motor VCM controls the position of the head HD in the diameter direction of the disk DSK by means of the arm mechanism AM. The head HD reads and writes data on the disk DSK at a prescribed position determined by the voice coil motor VCM. The ramp mechanism RMP serves as a retract area of the head HD when read/write of data is not performed.

The motor driving device MDIC is comprised of one semiconductor chip, for example. The motor driving device MDIC includes a digital-to-analogue converter DAC and a VCM driver VCMDV in order to drive the voice coil motor VCM. The motor driving device MDIC includes an SPM controller SPMCT, a sample hold circuit SH, a sense amplifier circuit SA, an analog-to-digital converter ADC, an SPM driver SPMDV, and a rotational position detector RPSDET, in order to drive the motor SPM. The motor driving device MDIC includes a serial IF & register unit SIFREG, in order to set up the drive conditions of the motor SPM and the voice coil motor VCM.

The read/write device RWIC drives the head HD to make the head HD perform read/write of data. The HDD controller HDDCT controls the whole HDD device. The HDD controller HDDCT communicates with the serial IF & register unit SIFREG of the motor driving device MDIC and instructs the motor driving device MDIC about the drive conditions of the motor SPM and the voice coil motor VCM. The HDD controller HDDCT also instructs the read/write device RWIC to perform read/write of data. In this case, the write data to be instructed to the read/write device RWIC and the read data obtained from the head HD via the read/write device RWIC are held in the cache memory CMEM.

Next, the general operation of the HDD device concerned is explained briefly. First, upon receiving a starting command of the motor SPM from the HDD controller HDDCT, the motor driving device MDIC drives the motor SPM via the SPM driver SPMDV, by means of a PWM signal generated by the SPM controller SPMCT. The current detection resistor RNF detects a drive current of the motor SPM.

The drive current of the motor SPM concerned is converted into a digital value by the sample hold circuit SH, the sense amplifier circuit SA, and the analog-to-digital converter ADC. Based on an error of a detection value (digital value) of the drive current concerned with reference to a current indication value used as a target value of the drive current, the SPM controller SPMCT generates a PWM signal for reducing the error concerned. The current indication value is indicated by the HDD controller HDDCT, for example.

The rotational position detector RPSDET detects a rotational position of the motor SPM, by detecting a back electromotive force (B-EMF) of the motor SPM, for example. The SPM controller SPMCT outputs, to the SPM driver SPMDV, the PWM signal for bringing the drive current of the motor SPM close to the current indication value, at an appropriate timing corresponding to the rotational position of the motor SPM. Consequently, the SPM controller SPMCT performs the rated rotation control of the motor SPM (that is, the disk DSK). After the motor SPM reaches the state of the rated rotation, the VCM driver VCMDV moves the head HD onto the disk DSK, and the head HD reads and writes data on the disk DSK.

Such a motor system may operate with the electric power from a battery, as represented by a notebook PC. Such a motor system using a battery requires power saving in particular. Therefore, it becomes useful to employ the motor driving system according to the present embodiment described below.

«The Configuration and Operation of a Principal Part of the Motor Driving Device»

Figure 2:
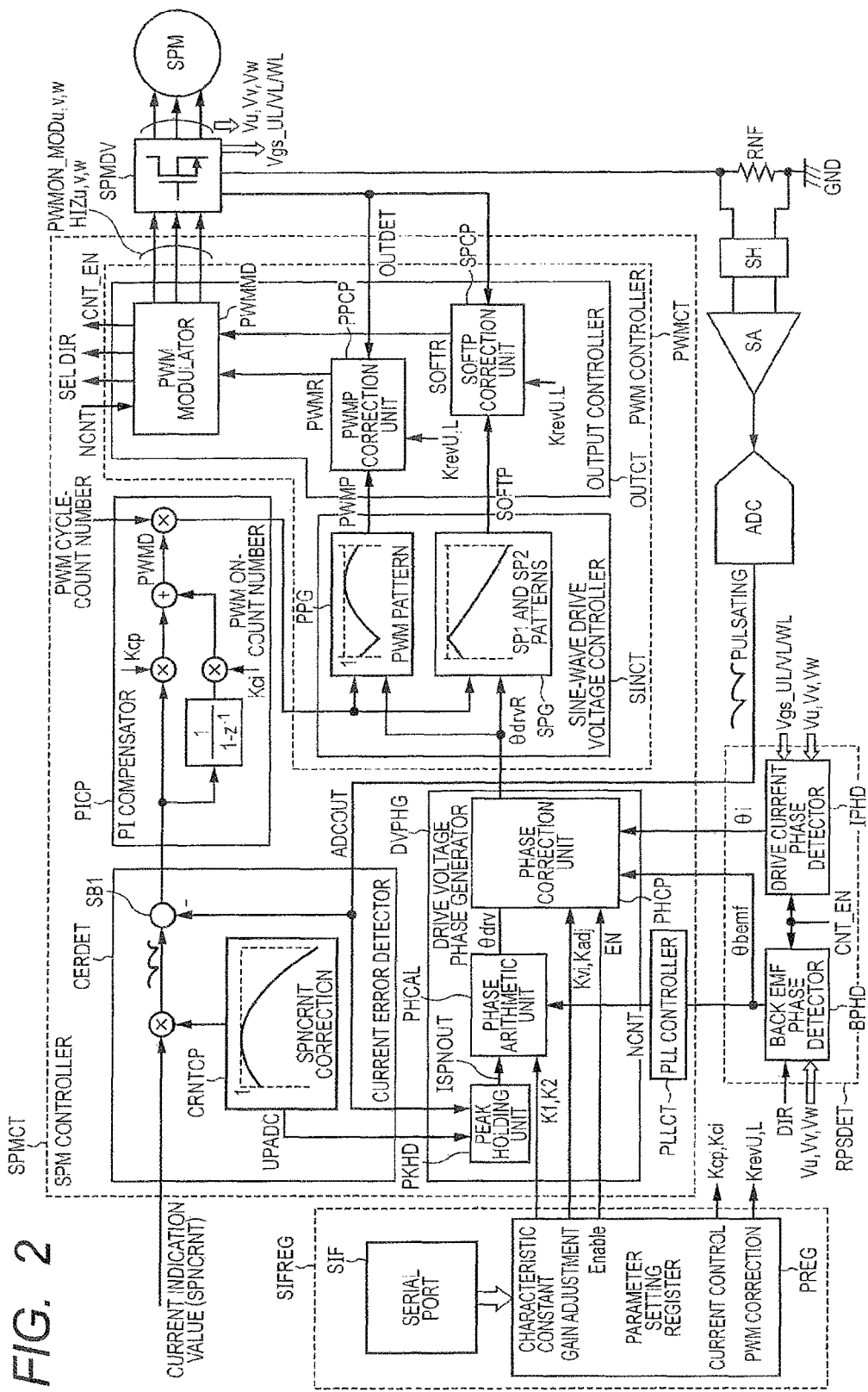
FIG. 2 is a functional block diagram illustrating an example of the configuration of a principal part of a motor driving device illustrated in FIG. 1.

FIG. 2 is a functional block diagram illustrating an example of the configuration of a principal part of the motor driving device illustrated in FIG. 1. FIG. 3A, FIG. 3B, FIG. 3C, and FIG. 4 are explanatory drawings illustrating the principle of operation of a sine-wave drive voltage controller SINCT illustrated in FIG. 2. FIG. 2 illustrates the SPM controller SPMCT, the SPM driver SPMDV, the rotational position detector RPSDET, the serial IF & register unit SIFREG, the sample hold circuit SH, the sense amplifier circuit SA, and the analog-to-digital converter ADC, extracted from the motor driving device MDIC illustrated in FIG. 1. In addition, FIG. 2 illustrates the current detection resistor RNF provided in the external of the motor driving device MDIC, and the motor SPM in the disk mechanism DSKM.

As described above, the current detection resistor RNF performs detection of the drive current of the motor SPM and voltage conversion, and the sample hold circuit SH holds the detection voltage concerned successively at a prescribed timing. Specifically, the sample hold circuit SH performs sampling at the timing at which a drive current of each phase (u phase, v phase, w phase) of the motor SPM can be detected. Consequently, the detection voltage proportional to the drive current of each phase is held. The sense amplifier circuit SA amplifies the held detection voltage concerned, and the analog-to-digital converter ADC converts the amplified voltage concerned into a digital value.

The rotational position detector RPSDET is provided with a back electromotive force phase detector (hereinafter called a back EMF phase detector) BPHD and a drive current phase detector IPHD. The back EMF phase detector BPHD detects a reference voltage phase θbemf used as the phase of the back electromotive force (B-EMF) of the motor SPM. The drive current phase detector IPHD detects a reference current phase θi used as the phase of the drive current of the motor SPM. The SPM controller SPMCT includes a PLL controller PLLCT, a drive voltage phase generator DVPHG, a current error detector CERDET, a PI compensator PICP, and a PWM controller PWMCT.

The PLL controller PLLCT generates an energization control timing which is synchronized with the reference voltage phase θbemf concerned, based on the reference voltage phase θbemf outputted from the back EMF phase detector BPHD, with the use of the feedback control of a PLL (Phase Locked Loop). Here, the PLL controller PLLCT generates a rotational cycle count value NCNT as one of the energization control timings. The rotational cycle count value NCNT is a value which is obtained by converting a time proportional to one cycle of a back electromotive force (B-EMF) (that is, a rotational cycle of the motor SPM) into a count value of the reference clock of digital control, and is a value inversely proportional to an angular frequency (ω) of the motor SPM.

The current error detector CERDET detects an error between the current indication value SPNCRNT and the digital value outputted from the analog-to-digital converter ADC (that is, the detection value of the drive current of each phase), with the use of a subtractor SB1. The current indication value SPNCRNT is indicated by the HDD controller HDDCT illustrated in FIG. 1 as described above. The HDD controller HDDCT receives the information on the angular frequency of the motor SPM obtained from the rotational cycle count value NCNT for example, and generates the current indication value SPNCRNT for setting the angular frequency concerned to a target angular frequency with the aid of a prescribed calculation.

The PI compensator PICP performs a proportionality (P)-integration (I) control with the input of the error value detected by the current error detector CERDET, and calculates a PWM duty value PWMD reflecting the current error. Then, the PI compensator PICP calculates a PWM ON-count number by multiplying this PWM duty value PWMD by the PWM cycle-count number determined in advance. The PWM cycle-count number is a number which is obtained by converting the time of one cycle of the PWM signal into the count value of the reference clock of the digital control, and the PWM ON-count number is a number which is obtained by converting the ON period in one cycle of the PWM signal into the count value concerned.

The PWM controller PWMCT includes a sine-wave drive voltage controller SINCT and an output controller OUTCT. When roughly described, the PWM controller PWMCT receives an energization control timing synchronized with the reference voltage phase θbemf from the PLL controller PLLCT, and generates a PWM (Pulse Width Modulation) signal PWMON_MOD (u, v, w) for controlling the drive voltage (Vu, Vv, Vw) to be applied to the motor SPM to a sine wave shape.

The sine-wave drive voltage controller SINCT receives the PWM ON-count number from the PI compensator PICP, and generates a duty indication value for each PWM cycle, required for applying three-phase sine-wave voltages to the motor SPM. The duty indication value expresses the ratio of the ON period in the PWM cycle. Specifically, the sine-wave drive voltage controller SINCT includes a PWM pattern generator PPG to generate a duty indication value PWMP for the PWM patterns, and a soft pattern generator SPG to generate a duty indication value SOFTP for soft patterns (SP1 and SP2).

Figure 3A:
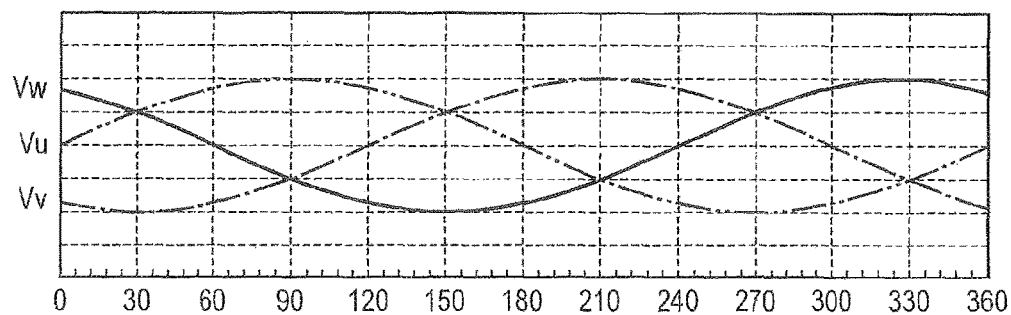
FIG. 3A, FIG. 3B, and FIG. 3C are explanatory drawings illustrating the principle of operation of a sine-wave drive voltage controller illustrated in FIG. 2.

The PWM pattern generator PPG and the soft pattern generator SPG generate the duty indication value on the principle as illustrated in FIG. 3A, FIG. 3B, FIG. 3C, and FIG. 4. First, in the case where what is called a sine-wave drive system (that is, a method to control the drive current of the motor to a sine wave shape) is applied as the drive system of the motor SPM, FIG. 3A illustrates ideal drive voltages Vu, Vv, and Vw of three phases (u phase, v phase, and w phase) applied to the motor SPM. The drive voltages Vu, Vv, and Vw concerned are sine-wave voltages which are mutually different by 120 degrees in phase.

Figure 3B:
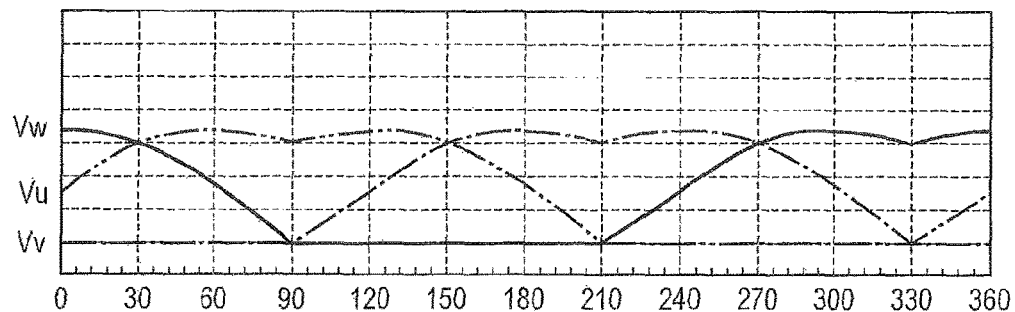

FIG. 3B illustrates the voltage waveform of each phase when a minimum voltage phase among the three-phase drive voltages Vu, Vv, and Vw illustrated in FIG. 3A is fixed to the ground power supply voltage GND (called a GND fixing in the present specification). For example, in FIG. 3A, the u phase is a minimum voltage phase in the period of electrical angles 210-330 degrees, and FIG. 3B illustrates the relative voltage waveforms of the v phase and the w phase when the GND fixing is applied to the drive voltage Vu of the u phase in the period concerned. As is the case with FIG. 3B, FIG. 3C illustrates the voltage waveform of each phase when a maximum voltage phase among the three-phase drive voltages Vu, Vv, and Vw illustrated in FIG. 3A is fixed to the supply voltage VM (called a VM fixing in the present specification).

Figure 3C:
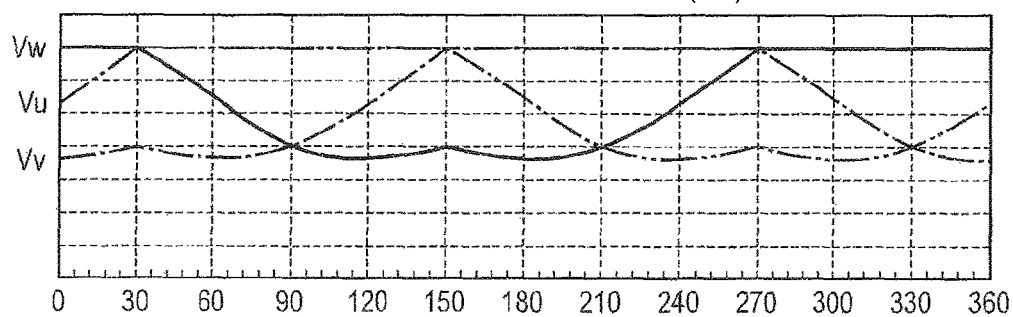
Figure 4:
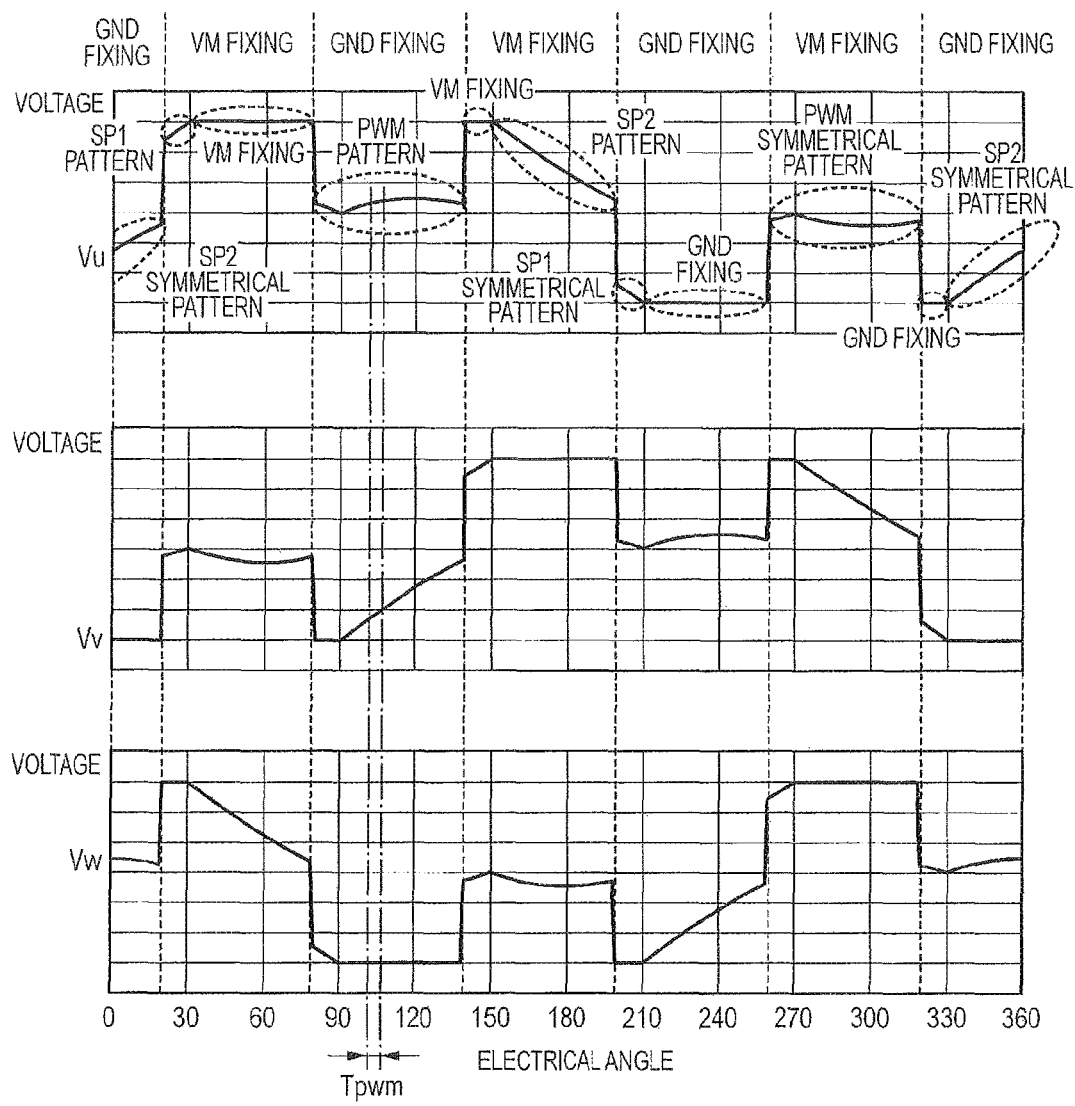
FIG. 4 is an explanatory drawing illustrating the principle of operation of the sine-wave drive voltage controller illustrated in FIG. 2.

Here, when the GND fixing illustrated in FIG. 3B and the VM fixing illustrated in FIG. 3C are switched alternately each electrical angle of 60 degrees, voltage waveforms as illustrated in FIG. 4 are obtained. As illustrated in FIG. 4, the drive voltage Vu of the u phase (same as in the v phase and the w phase) for performing sine wave driving can be generated by combining properly an SP1 pattern, a PWM pattern, an SP2 pattern, symmetrical patterns of these patterns, a VM fixing, and the GND fixing.

When explained in detail, the period of the electrical angle 0-360 degrees illustrated in FIG. 4 corresponds to the period of about 100 cycles of the PWM cycle Tpwm, for example. In the PWM cycle Tpwm illustrated in FIG. 4, in the condition that the GND fixing is applied to the w phase, the PWM pattern may be applied to the u phase and the SP2 symmetrical pattern may be applied to the v phase. Similarly, in each PWM cycle, the GND fixing or the VM fixing may be applied to one phase of the three phases, the PWM pattern or the PWM symmetrical pattern may be applied to another phase, and the SP1 pattern or SP2 pattern or these symmetrical patterns may be applied to the remaining one phase.

Based on such a principle, the PWM pattern generator PPG holds in advance on a table the duty indication value for each PWM cycle for realizing the voltage variation of the PWM pattern illustrated in FIG. 4, and generates the duty indication value PWMP based on the table concerned. The duty indication value PWMP is expressed by a count value based on the reference clock of the digital control, for example.

The table concerned holds the normalized duty indication value (for example, the count value). The PWM pattern generator PPG performs weighting based on the PWM ON-count number from the PI compensator PICP to the normalized duty indication value concerned, and generates the duty indication value PWMP. As a result, the PWM pattern generator PPG can generate the duty indication value PWMP for performing the sine wave driving of the motor SPM, after reflecting the current error described above.

Similarly, the soft pattern generator SPG holds in advance the duty indication value for each PWM cycle in the table, in order to realize the voltage variation of the soft pattern (the SP1 pattern and the SP2 pattern) illustrated in FIG. 4, for example, and generates the duty indication value SOFTP (for example, the count value) based on the table concerned. In this case, the soft pattern generator SPG also performs the weighting in the same manner as the PWM pattern generator PPG. As a result, the soft pattern generator SPG can generate the duty indication value SOFTP for performing the sine wave driving of the motor SPM, after reflecting the current error.

The output controller OUTCT includes a PWMP correction unit PPCP, an SOFTP correction unit SPCP, and a PWM modulator PWMMD. The PWMP correction unit PPCP detects a duty error which occurs between the input and the output of the SPM driver SPMDV, and generates the corrected duty indication value PWMR by adding correction value for offsetting the error concerned to the duty indication value PWMP. Specifically, the PWMP correction unit PPCP detects an actual duty from the output detecting signal OUTDET outputted from the SPM driver SPMDV, and determines a correction value based on the difference between the detected duty and the duty indication value PWMP.

Furthermore, the PWMP correction unit PPCP determines the correction value based on a prescribed arithmetic expression, when the duty indication value PWMP is greater than the duty determined by the PWM correction parameters KrevU and KrevL. That is, when the duty indication value PWMP is great, ON and OFF of a transistor become insufficient; accordingly, another correction value may be required which is different from the correction value in the case of a small duty indication value PWMP. The PWMP correction unit PPCP determines the correction value concerned based on the arithmetic expression. As is the case with the PWMP correction unit PPCP, the SOFTP correction unit SPCP generates the corrected duty indication value SOFTR by adding a prescribed correction value to the duty indication value SOFTP.

The PWM modulator PWMMD controls the energization to the actual motor SPM based on the energization control timing supplied from the PLL controller PLLCT. Specifically, the PWM modulator PWMMD performs switching of the GND fixing and the VM fixing every 60 degrees, as illustrated in FIG. 4. Responding to this switching, the PWM modulator PWMMD generates PWM signals PWMON_MODu, PWMON_MODv, and PWMON_MODw, respectively for the u phase, the v phase, and the w phase, based on the corrected duty indication values PWMR and SOFTR. The PWM modulator PWMMD generates signals HIZu, HIZv, and HIZw respectively aiming at turning off the u phase, the v phase, and the w phase for the back EMF phase detection. The detailed description thereof will be given later.

In detail, in each PWM cycle, the PWM modulator PWMMD fixes the PWM signal of one of three phases to the ON period or the OFF period (that is, to set it as the VM fixing or the GND fixing), based on the drive system illustrated in FIG. 4. The PWM modulator PWMMD sets the ON period of the PWM signal of another phase based on one of the corrected duty indication values PWMR and SOFTR, and sets the ON period of the PWM signal of the remaining one phase based on the other of the corrected duty indication values PWMR and SOFTR. In practice, each of the symmetrical patterns of the PWM pattern and the soft pattern is also needed, as illustrated in FIG. 4. The PWM modulator PWMMD also generates the PWM signal corresponding to each of the symmetrical patterns by digital calculation.

In this way, by employing the drive system illustrated in FIG. 4, the PWM modulator PWMMD is required to include not three but two real circuits which generate the PWM signal based on the corrected duty indication value (count value). Accordingly, it is possible to attain the reduction of the circuit area. By employing the drive system illustrated in FIG. 4, the control is performed to the amplitude from the VM fixing or the GND fixing, and it becomes advantageous with respect to the supply voltage margin. Accordingly, it is possible to enlarge the torque constant of the motor SPM and to reduce the power consumption.

Figure 5:
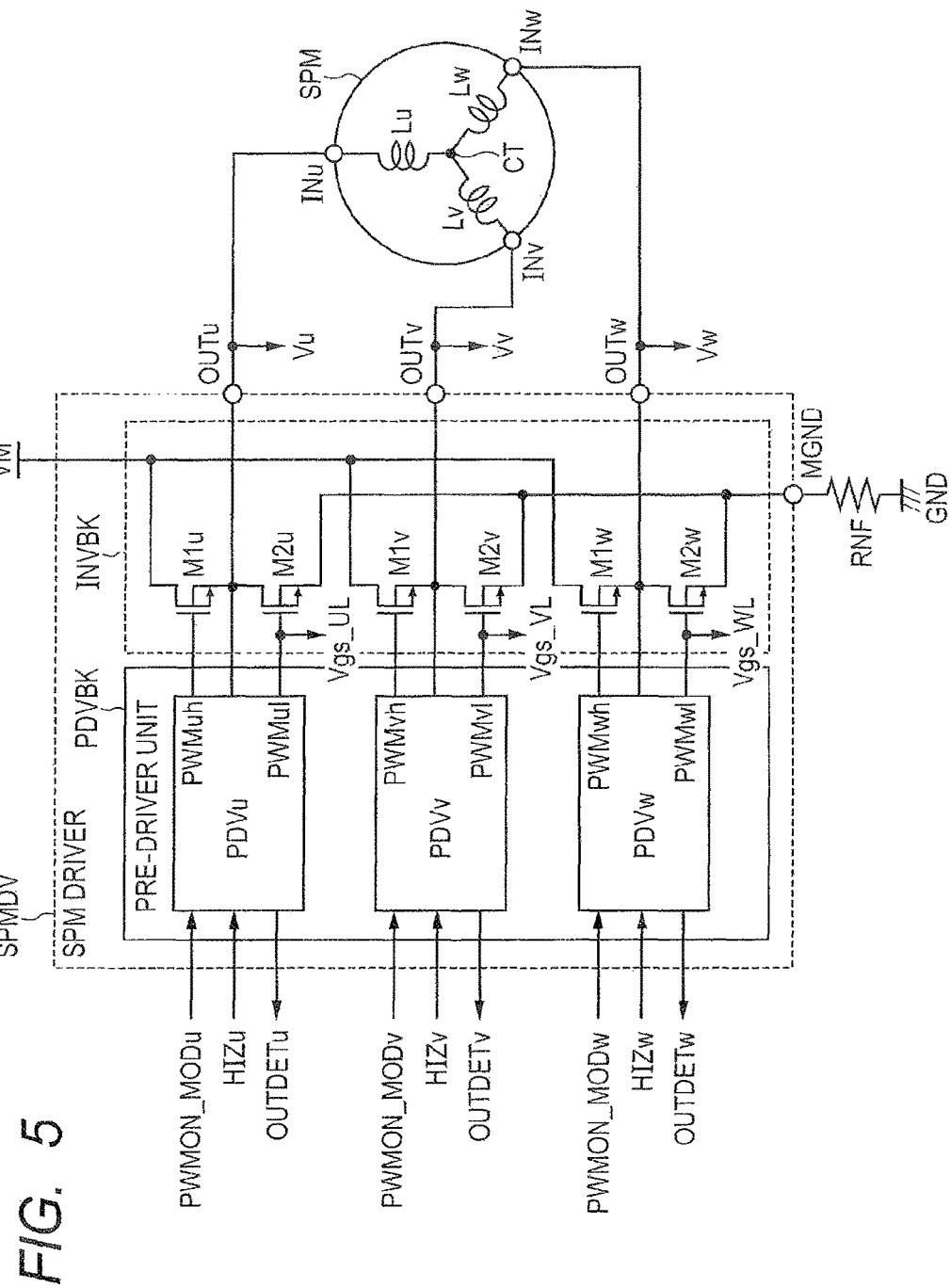
FIG. 5 is a circuit block diagram illustrating an example of the configuration of an SPM driver illustrated in FIG. 2.

FIG. 5 is a circuit block diagram illustrating an example of the configuration of the SPM driver illustrated in FIG. 2. The SPM driver SPMDV includes a pre-driver unit PDVBK and an inverter INVBK. The inverter INVBK includes a high-side transistor M1$u$ and a low-side transistor M2$u$ for the u phase, a high-side transistor M1$v$ and a low-side transistor M2$v$ for the v phase, and a high-side transistor M1w and a low-side transistor M2w for the w phase. Although not restricted in particular, the high-side transistors M1u, M1v, and M1w and the low-side transistors M2u, M2v, and M2w employ an NMOS transistor here.

Drains of the high-side transistors M1u, M1v, and M1w are coupled to the supply voltage VM in common, and sources of the low-side transistors M2u, M2v, and M2w are coupled to the motor ground terminal MGND in common. A source of the high-side transistor M1u and a drain of the low-side transistor M2u are coupled to a drive output terminal OUTu for the u phase. Similarly, a source of the high-side transistor M1v and a drain of the low-side transistor M2v are coupled to a drive output terminal OUTv for the v phase, and a source of the high-side transistor M1w and a drain of the low-side transistor M2w are coupled to a drive output terminal OUTw for the w phase. A motor ground terminal MGND is coupled to the ground power supply voltage GND via the current detection resistor RNF.

The drive output terminals OUTu, OUTv, and OUTw for the u phase, the v phase, and the w phase are respectively coupled to driving input terminals INu, INv, and INw for the u phase, the v phase, and the w phase of the motor SPM. The drive voltages Vu, Vv, and Vw of the u phase, the v phase, and the w phase are outputted from the drive output terminals OUTu, OUTv, and OUTw for the u phase, the v phase, and the w phase, respectively. The drive voltages Vu, Vv, and Vw have voltage waveforms as illustrated in FIG. 4 when looked at in a time average, and are PWM signals when observed at each time. The motor SPM includes coils Lu, Lv, and Lw for the u phase, the v phase, and the w phase which are star-connected between an equivalent neutral point CT and the driving input terminals INu, INv and INw, respectively.

The pre-driver unit PDVBK includes pre-drivers PDVu, PDVv, and PDVw for the u phase, the v phase, and the w phase, respectively. Based on a PWM signal PWMON_MODu for the u phase supplied from the PWM modulator PWMMD, the pre-driver PDVu for the u phase drives the high-side transistor M1u for the u phase by a PWM signal PWMuh, and the low-side transistor M2u by a PWM signal PWMul as a complementary signal of the PWM signal PWMuh.

The pre-driver PDVu concerned drives both of the high-side transistor M1u and the low-side transistor M2u to an OFF state, when the signal HIZu is at a high level. Accordingly, the drive output terminal OUTu becomes a high impedance and it becomes possible to observe the back electromotive force at the drive output terminal OUTu. The pre-driver PDVu concerned converts the PWM signal outputted from the drive output terminal OUTu into a pulse signal of a prescribed voltage level, and outputs the pulse signal concerned as an output detecting signal OUTDETu described above.

Similarly, based on a PWM signal PWMON_MODv for the v phase supplied from the PWM modulator PWMMD, the pre-driver PDVv for the v phase drives the high-side transistor M1v and the low-side transistor M2v for the v phase by PWM signals PWMvh and PWMvl, respectively. The pre-driver PDVv concerned drives both transistors (M1v, M2v) to an OFF state, when the signal HIZv is at a high level. Accordingly, it becomes possible to observe the back electromotive force at the drive output terminal OUTv. The pre-driver PDVv concerned outputs an output detecting signal OUTDETv.

Based on a PWM signal PWMON_MODw for the w phase supplied from the PWM modulator PWMMD, the pre-driver PDVw for the w phase drives the high-side transistor M1w and the low-side transistor M2w for the w phase by PWM signals PWMwh and PWMwl, respectively. The pre-driver PDVw concerned drives both transistors (M1w, M2w) to an OFF state, when the signal HIZw is at a high level. Accordingly, it becomes possible to observe the back electromotive force at the drive output terminal OUTw. The pre-driver PDVw concerned outputs an output detecting signal OUTDETw.

Here, returning to FIG. 2, the PWM modulator PWMMD outputs a PWM signal to the SPM driver SPMDV, switching every 60 degrees as described above. Since the drive current of the motor SPM is in the shape of a sine wave, the electric current detected by the current detection resistor RNF becomes an electric current of a repeated cycle of 60 degrees including a peak of the sine wave. Therefore, the current error detector CERDET includes an indicating current correction unit CRNTCP to generate a digital pattern which reproduces this sinusoidal wave. The current error detector CERDET multiplies the digital pattern outputted from the indicating current correction unit CRNTCP to the current indication value SPNCRNT described above, and outputs the multiplication result concerned instead of the current indication value SPNCRNT, to the subtractor SB1.

The drive voltage phase generator DVPHG includes a peak holding unit PKHD, a phase arithmetic unit PHCAL, and a phase correction unit PHCP. The peak holding unit PKHD holds a digital value ADCOUT outputted from the analog-to-digital converter ADC in response to a trigger signal UPADC supplied from the indicating current correction unit CRNTCP, and outputs a current value (amplitude value) ISPNOUT of the drive current of each phase. The indicating current correction unit CRNTCP outputs the trigger signal UPADC at the position of the maximum amplitude of the digital pattern to be generated, for example.

The phase arithmetic unit PHCAL and the phase correction unit PHCP determine a phase θdrvR of the drive voltage which is necessary to set the phase difference between the reference voltage phase θbemf and the reference current phase θi to a prescribed value (for example, zero), and indicate the determined phase θdrvR to the sine-wave drive voltage controller SINCT. The detailed description thereof will be given later. The sine-wave drive voltage controller SINCT shifts the PWM pattern and the soft pattern illustrated in FIG. 4 by the electrical angle based on the indicated phase θdrvR, and generates the duty indication values PWMP and SOFTP, using the shifted pattern. As a result, the phase of the drive voltages Vu, Vv, and Vw is controlled based on the phase θdrvR concerned, and the phase of the drive current in each phase of the motor SPM is also controlled correspondingly, based on the phase θdrvR concerned.

The serial IF & register unit SIFREG includes a serial port SIF and a parameter setting register PREG which can be accessed via the serial port SIF concerned. The parameter setting register PREG holds the various parameters which are set up by the HDD controller HDDCT illustrated in FIG. 1, for example. Here, the various parameters include characteristic constants K1 and K2 of the motor SPM, gain adjustment parameters Kvi and Kadj, an enabling setting signal EN, current control parameters Kcp and Kci, and PWM correction parameters KrevU and KrevL.

The characteristic constants K1 and K2, the gain adjustment parameters Kvi and Kadj, and the enabling setting signal EN are employed by the drive voltage phase generator DVPHG. The detailed description thereof will be given later. The current control parameters Kcp and Kci are employed as a proportional gain and an integration gain of the PI control in the PI compensator PICP. The PWM correction parameters KrevU and KrevL are employed by the PWMP correction unit PPCP and the SOFTP correction unit SPCP, as described above.

《Outline of the Drive Voltage Phase Generator》

Figure 6:
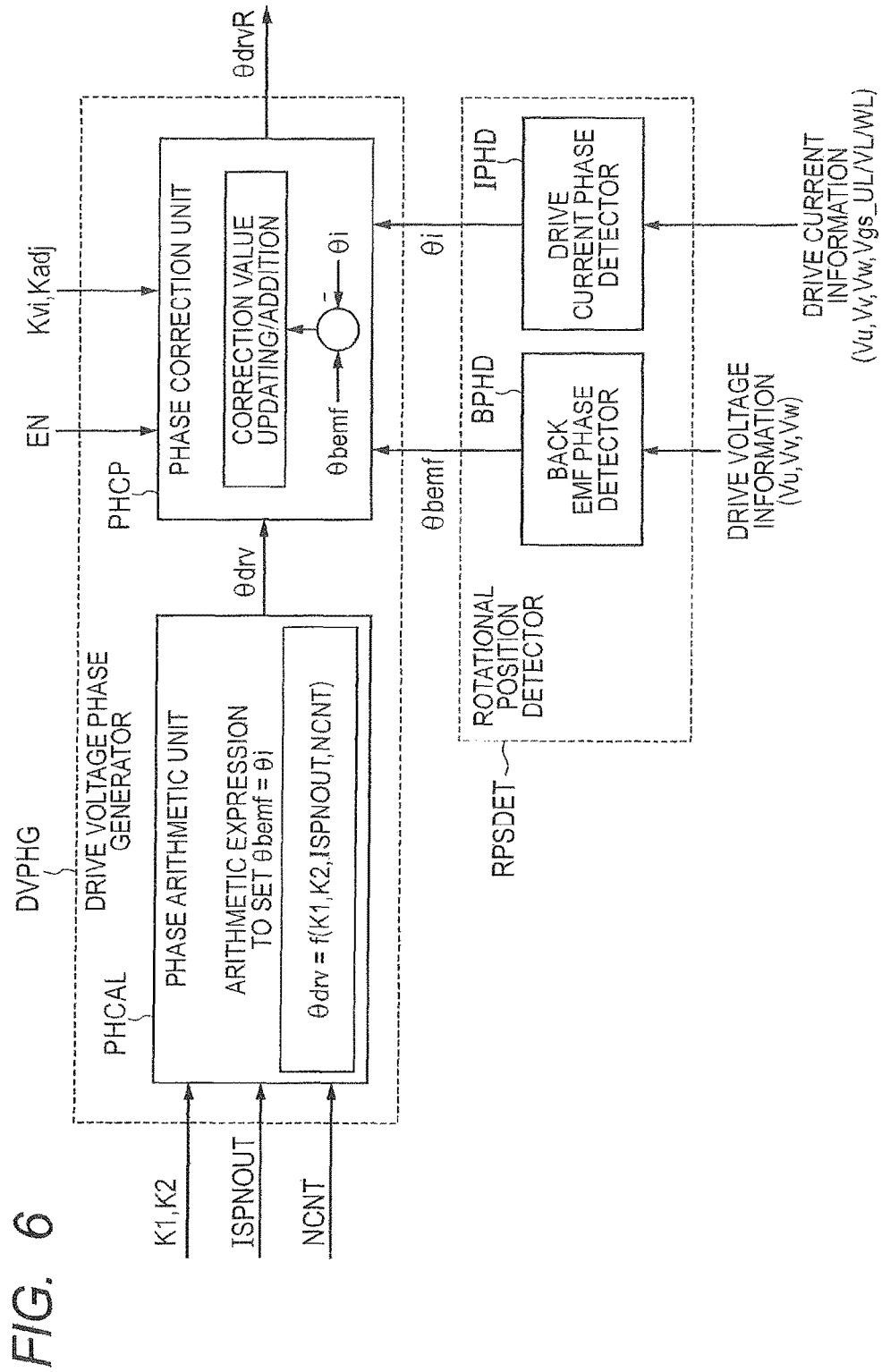
FIG. 6 is a block diagram illustrating an example of the outline configuration of a principal part of a drive voltage phase generator and the circumference thereof illustrated in FIG. 2.

FIG. 6 is a block diagram illustrating an example of the outline configuration of a principal part of the drive voltage phase generator and the periphery thereof illustrated in FIG. 2. Extracted from FIG. 2, FIG. 6 illustrates the phase arithmetic unit PHCAL and the phase correction unit PHCP in the drive voltage phase generator DVPHG, and the back EMF phase detector BPHD and the drive current phase detector IPHD in the rotational position detector RPSDET.

The phase arithmetic unit PHCAL evaluates an arithmetic expression which uses a current value of the drive current of each phase of the motor SPM, an angular frequency (ω) of the motor SPM, and the characteristic constants K1 and K2 of the motor SPM described above. The current value of the drive current is obtained from the current value ISPNOUT outputted from the peak holding unit PKHD illustrated in FIG. 2. The angular frequency (ω) of the motor SPM is obtained from the rotational cycle count value NCNT outputted from the PLL controller PLLCT illustrated in FIG. 2. The phase arithmetic unit PHCAL evaluates the arithmetic expression concerned to calculate the phase θdrv of the drive voltage for reducing the phase difference between the reference voltage phase θbemf and the reference current phase θi to zero substantially.

For example, in a brush-less motor, the phase difference between the magnetic field of a rotor and the magnetic field of a stator (winding) can be set to 90 degrees by reducing the phase difference between the reference voltage phase θbemf and the reference current phase θi to zero substantially; consequently, the motor can be driven at the biggest torque. As a result, it is possible to drive the motor with the high degree of efficiency and to reduce the consumption current required for maintaining a constant rotation.

However, the phase θdrv calculated by the phase arithmetic unit PHCAL changes corresponding to the characteristic constants K1 and K2 of the motor SPM. The characteristic constants K1 and K2 are determined for every kind of the motor, for example. However, even if a motor SPM of the same kind is used, there is a possibility that variations in the characteristic constants K1 and K2 resulting from manufacturing variations for example may occur in each motor. Even if a single motor SPM is referred to as a target, there is a possibility that variations in the characteristic constants K1 and K2 may occur in chronological order due to time degradation. Accordingly, an error deviating from the ideal value (here zero) occurs in the phase difference between the reference voltage phase θbemf and the reference current phase θi. As a result, the efficiency of the motor may decrease and the power consumption may increase.

Therefore, the phase correction unit PHCP adds a correction value to the phase θdrv outputted from the phase arithmetic unit PHCAL and determines the phase θdrvR after the correction. In this case, the phase correction unit PHCP inputs the reference voltage phase θbemf and the reference current phase θi, and updates the magnitude of the correction value by the feedback control so as to converge the phase difference between the reference voltage phase θbemf and the reference current phase θi to a prescribed value (here zero). That is, as the feedback path, as illustrated in FIG. 2, a drive current flows toward the motor SPM based on the phase θdrvR after the correction, the phase of the drive current concerned and the phase of the back electromotive force are detected by the rotational position detector RPSDET, the correction value is updated based on this detection result, and a new phase θdrvR is determined.

As described above, the phase correction unit PHCP calculates the correction value which reduces the phase difference to a prescribed value (here zero), based on the actual detection result of the reference voltage phase θbemf and the reference current phase θi. Therefore, even when the manufacturing variations and the time degradation occur in the motor SPM, it is possible to determine the phase difference concerned as an ideal value with a high degree of accuracy, and it is possible to optimize the phase of the drive current of the motor SPM. As a result, it becomes possible to attain the high efficiency of the motor SPM, and consequently it is possible to realize the power saving of the motor driving device and the motor system.

Figure 7:
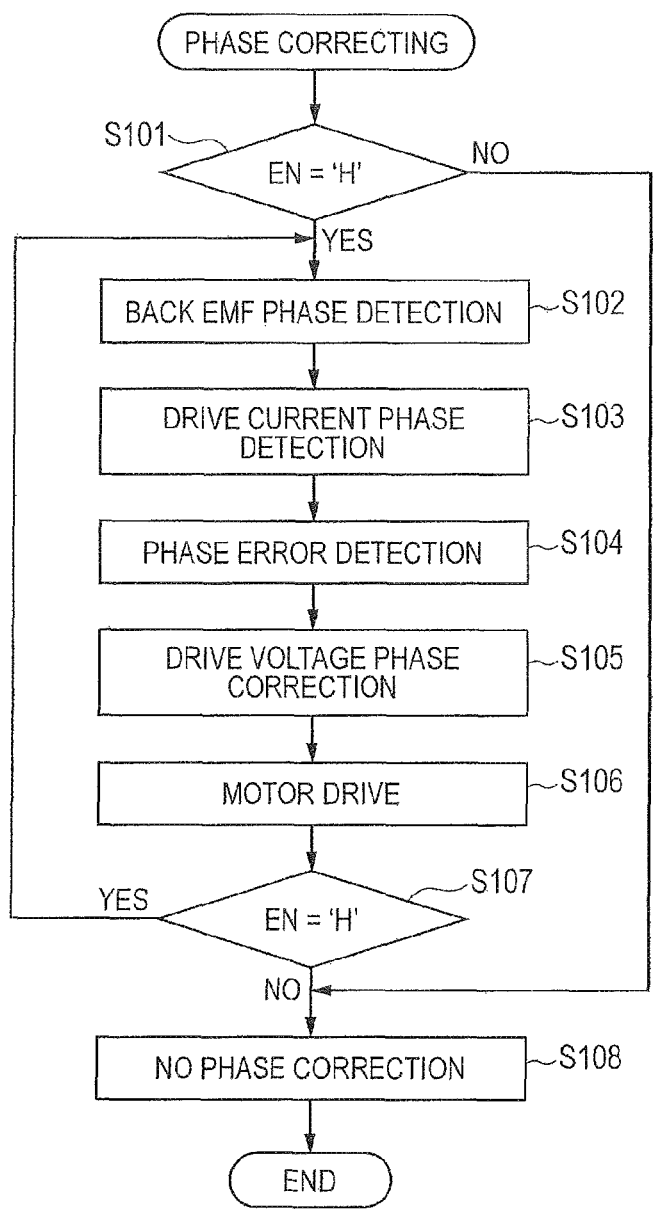
FIG. 7 is a flow chart illustrating an example of an entire operation of a phase correction unit illustrated in FIG. 6.

FIG. 7 is a flow chart illustrating an example of an entire operation of the phase correction unit illustrated in FIG. 6. In FIG. 7, the phase correction unit PHCP determines whether the enabling setting signal EN set by the parameter setting register PREG illustrated in FIG. 2 is at an H level (enabled state) (Step S101). When the enabling setting signal EN is in an enabled state, the phase correction unit PHCP detects the reference voltage phase θbemf and the reference current phase θi via the back EMF phase detector BPHD and the drive current phase detector IPHD, respectively (Steps S102 and S103).

Subsequently, the phase correction unit PHCP detects the error between the prescribed value (here zero) and the phase difference between the reference voltage phase θbemf and the reference current phase θi (Step S104), and updates the correction value to determine the phase θdrvR of a new drive voltage (Step S105). Then, the phase correction unit PHCP drives the motor SPM via the PWM controller PWMCT and the SPM driver SPMDV, with the use of this new phase θdrvR of the drive voltage (Step S106).

The phase correction unit PHCP performs repeatedly the processing at Steps S102-S106, as long as the enabling setting signal EN is in an enabled state (Step S107). On the other hand, at Step S101 or Step S107, when the enabling setting signal EN is at an L level (disabled state), the phase correction unit PHCP terminates the processing, without performing the phase correction (that is, setting the correction value as zero) (Step S108). In this way, in the period when the enabling setting signal EN is at an H level (enabled state), it is possible to set the drive voltage (consequently, the drive current) in the optimal phase at all times even when an environmental change occurs.

《Details of the Phase Arithmetic Unit and the Phase Correction Unit》

Figure 8:
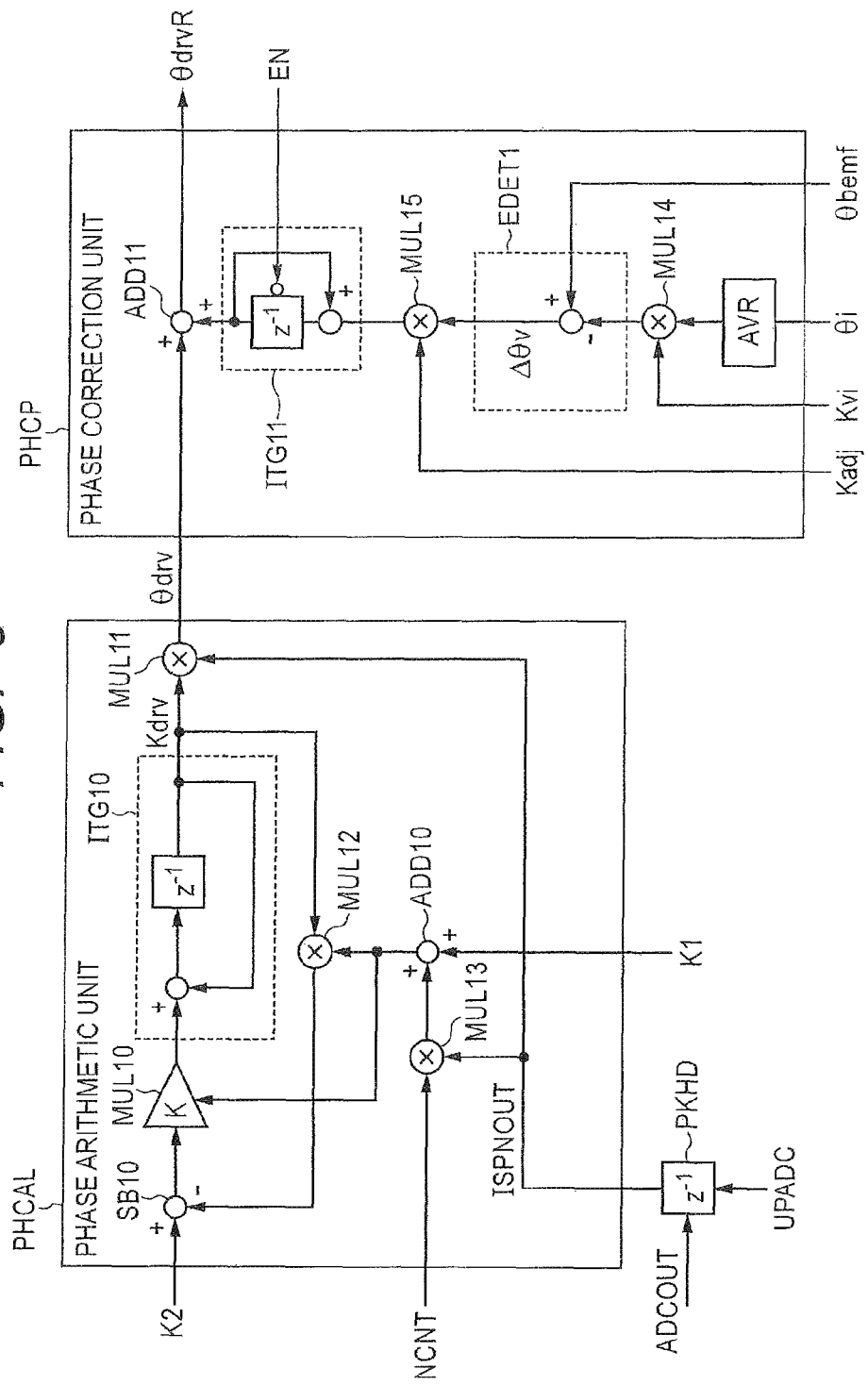
FIG. 8 is a block diagram illustrating an example of the detailed configuration of a phase arithmetic unit and a phase correction unit in a drive voltage phase generator illustrated in FIG. 6.
Figure 9A:
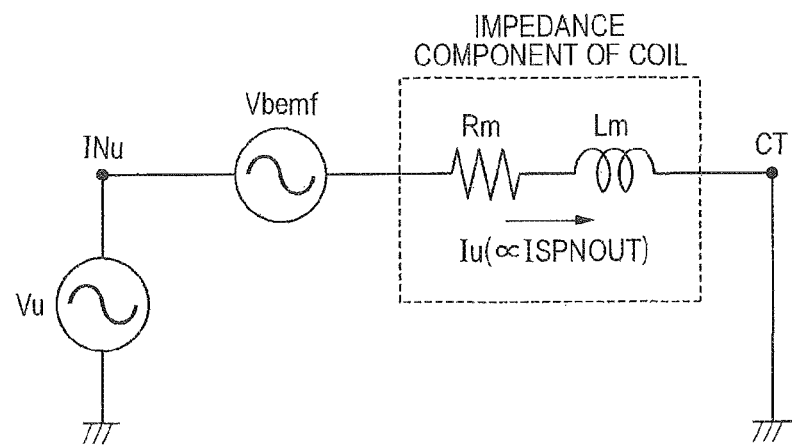
FIG. 9A and FIG. 9B are supplementary drawings explaining the operation of the phase arithmetic unit illustrated in FIG. 8.
Figure 9B:
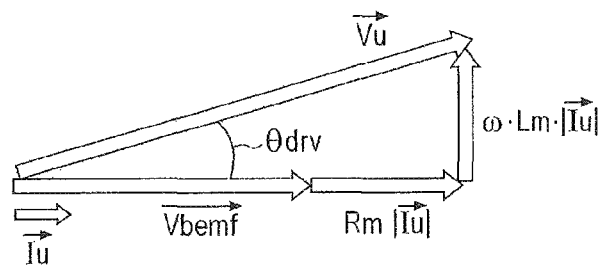

FIG. 8 is a block diagram illustrating an example of the detailed configuration of the phase arithmetic unit and the phase correction unit in the drive voltage phase generator illustrated in FIG. 6. FIG. 9A and FIG. 9B are supplementary drawings explaining the operation of the phase arithmetic unit illustrated in FIG. 8. First, FIG. 9A illustrates an equivalent circuit of each phase of the motor SPM. Each phase (the u phase as a representative) of the motor SPM is expressed by a back electromotive force Vbemf, a motor resistance Rm, and a motor inductance Lm which are coupled in series between the driving input terminal INu and the neutral point CT. The motor resistance Rm and the motor inductance Lm express the actual impedance components which the coil Lu illustrated in FIG. 5 has. The motor driving device MDIC applies a drive voltage Vu to such a series circuit and makes a drive current Iu flow through the coil Lu.

The vector diagram illustrated in FIG. 9B expresses the voltage phase relation in the case in which the phase difference between the reference voltage phase θbemf of the back electromotive force Vbemf and the reference current phase θi of the drive current Iu is set to zero in FIG. 9A (that is, the case in when the vectors of the back electromotive force Vbemf and the drive current Iu coincide in direction). As illustrated in FIG. 9B, in order to set the phase difference between the reference voltage phase θbemf and the reference current phase θi to zero, it is necessary to advance the drive voltage Vu by the phase θdrv with reference to the reference voltage phase θbemf.

This phase θdrv is expressed by Equation (1) in terms of the angular frequency ω and the torque constant Ke of the motor SPM. In Equation (1), "ω·Ke" corresponds to the back electromotive force Vbemf illustrated in FIG. 9B.

$$\theta drv = \tan^{-1}\{\omega \cdot Lm \cdot Iu/(\omega \cdot Ke + Rm \cdot Iu)\} \quad (1)$$

Here, the phase θdrv becomes a sufficiently small value ordinarily. In this case, "$\tan^{-1}$" can be excluded by employing the approximation expressed by Equation (2). The excluded equation is transformed to derive Equation (3).

$$\theta drv \approx \tan^{-1}(\theta drv) \quad (2)$$

$$\theta drv = (Lm/Rm) \cdot Iu/\{(Ke/Rm) + (Iu/\omega)\} \quad (3)$$

The phase arithmetic unit PHCAL illustrated in FIG. 8 calculates the phase θdrv based on Equation (3). Specifically, in Equation (3), the value corresponding to "Ke/Rm" is set by the characteristic constant K1, the value corresponding to "Lm/Rm" is set by the characteristic constant K2, the value corresponding to "Iu" is set by the current value ISPNOUT supplied from the peak holding unit PKHD, and the value corresponding to "1/ω" is set by the rotational cycle count value NCNT. In this case, Equation (3) turns into Equation (4) and the phase θdrv is obtained by multiplying "ISPNOUT" to "Kdrv" of Equation (5).

$$\theta drv = K \cdot ISPNOUT/(K1 + ISPNOUT \cdot NCNT) \quad (4)$$

$$Kdrv = K2/(K1 + ISPNOUT \cdot NCNT) \quad (5)$$

The phase arithmetic unit PHCAL illustrated in FIG. 8 includes a subtractor SB10, multipliers MUL10-MUL13, an integrator ITG10, and an adder ADD10. The multiplier MUL13 calculates "NCNT·ISPNOUT", and the adder ADD10 calculates the denominator of Equation (5) by adding "K1" to the output of the multiplier MUL13. The multiplier MUL12 multiplies "Kdrv" to the output of the adder ADD10. The subtractor SB10 calculates the error between the multiplication result of the multiplier MUL12 and "K2", and the multiplier MUL10 amplifies the error concerned by the integration gain K. The integrator ITG10 integrates the multiplication result of the multiplier MUL10 to calculate "Kdrv" of Equation (5).

That is, the phase arithmetic unit PHCAL illustrated in FIG. 8 includes an arithmetic circuit which calculates "Kdrv" by performing the feedback control on "Kdrv" so that the error between the multiplication result by the multiplier MUL12 (that is, "Kdrv·(K1+ISPNOUT·NCNT)") and "K2" may converge to zero. When the error has converged to zero, "Kdrv·(K1+ISPNOUT·NCNT)" becomes equal to "K2", and, as a result, "Kdrv" becomes a value expressed by Equation (5). The multiplier MUL11 calculates the phase θdrv of Equation (4) by multiplying "ISPNOUT" to "Kdrv."

In this way, by employing the arithmetic circuit utilizing a feedback control, Equation (4) can be evaluated without employing a divider which can have a complicated configuration; accordingly, it is possible to attain simplification of the circuit configuration. Here, the multiplier MUL10 has a configuration in which the integration gain K is variably controlled according to the calculation result of the adder ADD10. Specifically, the integration gain K is controlled to become smaller gradually, as the output of the adder ADD10 becomes larger, for example. Accordingly, it is possible to keep the band of the feedback control to the same degree, irrespective of the magnitude of the output of the adder ADD10.

The phase correction unit PHCP illustrated in FIG. 8 includes an averaging circuit AVR, multipliers MUL14 and MUL15, an error detector EDET1, an integrator ITG11, and an adder ADD11. The averaging circuit AVR averages the inputted reference current phase θi in time series. The multiplier MUL14 multiplies a gain adjustment parameter Kvi to the averaged reference current phase θi concerned. The error detector EDET1 calculates the phase difference Δθv between the inputted reference voltage phase θbemf and the multiplication result of the multiplier MUL14, and detects the error (here Δθv) between the phase difference Δθv concerned and the prescribed value (here zero).

The multiplier MUL15 multiplies a gain adjustment parameter (that is, an integration gain) Kadj to the detection result of the error detector EDET1, and the integrator ITG11 calculates a correction value by integrating the multiplication result of the multiplier MUL15. The adder ADD11 adds the correction value calculated by the integrator ITG11 to the phase θdrv outputted from the phase arithmetic unit PHCAL to calculate the phase θdrvR after the correction. As illustrated in FIG. 7, the integrator ITG11 is configured so as to set the correction value as zero, when the enabling setting signal EN is at an 'L' level (disabled state).

The gain adjustment parameter Kvi is a coefficient which matches the sensitivity of the phase θdrvR to the reference current phase θi with the sensitivity of the phase θdrvR to the reference voltage phase θbemf. That is, for example, as understood from the vector diagram illustrated in FIG. 9B, the case where the reference current phase θi is varied by Δθ (that is, the case where the direction of the vector of the drive current Iu deviates) and the case where the reference voltage phase θbemf is varied by Δθ (that is, the case where the direction of the vector of the back electromotive force Vbemf deviates) have different influences on the phase θdrvR. When the feedback control is performed based on the error between the two inputs which have different sensitivity in this way, there is a possibility that the control may become unstable. Therefore, it is desirable to detect the error, after matching the sensitivity of two inputs by the gain adjustment parameter Kvi.

In the present description, the multiplier MUL14 is provided on the side of the reference current phase θi. However, it is also possible to provide the multiplier MUL14 on the side of the reference voltage phase θbemf instead. Furthermore, in the present description, the correction value is calculated by the integrator ITG11. However, depending on circumstances, it is also possible to perform the PI control and the PID control by adding the path of proportional control and the path of differential control in parallel with the integrator ITG11 concerned.

《The Configuration and Operation of the Rotational Position Detector》

FIG. 10 is a waveform chart illustrating an example of the detection period of the rotational position detector illustrated in FIG. 6. FIG. 10 illustrates the drive voltages Vu, Vv, and Vw of each phase applied to the motor SPM and the drive current Iu of the prescribed phase (here the u phase). As illustrated in FIG. 10, the drive voltages Vu, Vv, and Vw are PWM signals when observed at each time, and become the voltage waveforms as illustrated in FIG. 4 when observed in the time average.

Here, the inverter INVBK illustrated in FIG. 5 applies the drive voltages Vu, Vv, and Vw to the motor, according to a 180-degree energization system without a non-energization period, based on the drive system illustrated in FIG. 4. The non-energization period is a period when the energization is stopped, and is a period when the drive output terminals OUTu, OUTv, and OUTw are disconnected by setting the signals HIZu, HIZv, and HIZw to an 'H' level (however, what is called a dead time is excluded). However, in order to detect the phase of the back electromotive force Vbemf of the u phase, for example, it is necessary to provide a non-energization period in a prescribed period including the zero crossing point (at the time of passing the mean value of the amplitude) of the back electromotive force Vbemf.

Therefore, the PWM modulator PWMMD illustrated in FIG. 2 provides a non-energization period (for example, about 15 degrees) in the energization period of 360 degrees, and controls a back EMF detection enable signal CNT_EN1 to an 'H' level in the non-energization period concerned as illustrated in FIG. 10. As illustrated in FIG. 10, the PWM modulator PWMMD controls a drive current detection enable signal CNT_EN2 to an 'H' level, in the energization period which is different in phase by 180 degrees from the non-energization period concerned. The period of the 'H' level of the drive current detection enable signal CNT_EN2 concerned is the same length (for example, about 15 degrees) as the non-energization period described above, for example.

The back EMF phase detector BPHD detects the reference voltage phase θbemf by detecting the zero crossing point of the back electromotive force Vbemf in the period when the back EMF detection enable signal CNT_EN1 is at an 'H' level. The drive current phase detector IPHD detects the reference current phase θi by detecting the zero crossing point of the drive current Iu in the period when the drive current detection enable signal CNT_EN2 is at an 'H' level.

Here, as illustrated in FIG. 2, the PWM modulator PWMMD controls the energization to the motor SPM based on the energization control timing supplied from the PLL controller PLLCT (what is called the zero crossing point of the back electromotive force Vbemf in the past). Therefore, the PWM modulator PWMMD can narrow down the period when the zero crossing point of the back electromotive force Vbemf may exist in the near future, to a sufficiently narrow range (for example, about 15 degrees). Since this non-energization period becomes a factor which distorts the sine wave of the drive current Iu, the non-energization period is set to a period shorter than 60 degrees at longest, and to be shorter is more desirable. However, if the non-energization period is too short, there may be the situation where a zero crossing point does not exist within the period, due to a variation of the angular velocity co of the motor SPM. Accordingly, the non-energization period is determined in view of these trade-offs.

In FIG. 8 explained above, the phase correction unit PHCP sets the phase difference to a prescribed value based on the actual detection results of the reference voltage phase θbemf and the reference current phase θi. Accordingly, depending on circumstances, a method can be also considered in which the phase difference is set to a prescribed value, not employing the phase arithmetic unit PHCAL illustrated in FIG. 8 but employing only the similar configuration as the phase correction unit PHCP. In this case, however, it becomes difficult to guarantee that the zero crossing point of the drive current Iu exists in the period when the drive current detection enable signal CNT_EN2 is at an 'H' level in FIG. 10.

That is, in FIG. 10, by the act of the phase arithmetic unit PHCAL illustrated in FIG. 8, the phase difference between the reference voltage phase θbemf and the reference current phase θi is made to take a value near zero to some extent. Consequently, it becomes possible to set the phase detection period of the drive current in the part where the phase is different from the non-energization period by 180 degrees. It is also possible to guarantee the existence of a zero crossing point of the drive current within the period concerned by extending the phase detection period of the drive current. However, in this case, it is likely that the convergence of the feedback control takes long time, and it is also likely that the design of the feedback control circuit becomes complicated.

From such a viewpoint, it becomes useful to employ the phase arithmetic unit PHCAL and the phase correction unit PHCP together. As another viewpoint, by providing the phase correction unit PHCP, the setting accuracy of the characteristic constants K1 and K2 in the phase arithmetic unit PHCAL can be eased. That is, it is sufficient that the setting accuracy of the characteristic constants K1 and K2 has the degree of accuracy with which a zero crossing point can be maintained in the phase detection period of the drive current. Accordingly, it is possible to facilitate the setting.

In the example illustrated in FIG. 10, the detection of the reference voltage phase θbemf and the reference current phase θi is performed for the u phase. In this case, it is not necessary to provide a non-energization period with regard to the v phase and the w phase particularly. As a matter of course, the detection target does not need to be the u phase and it may be the v phase or the w phase.

«Details of the Back EMF Phase Detector»

Figure 11:
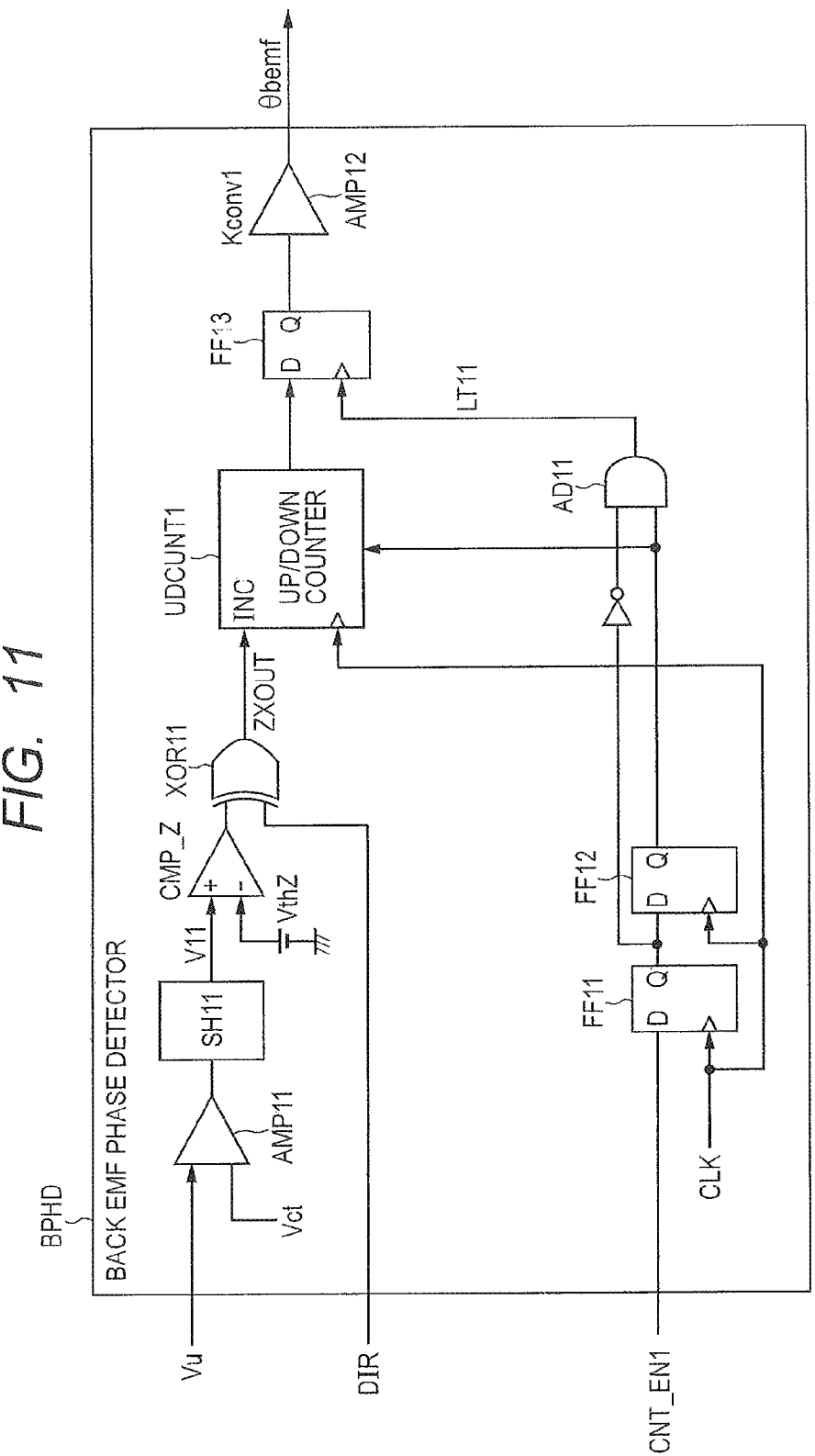
FIG. 11 is a circuit diagram illustrating an example of the detailed configuration of a back electromotive force (back EMF) phase detector illustrated in FIG. 6.

FIG. 11 is a circuit diagram illustrating an example of the detailed configuration of the back EMF phase detector illustrated in FIG. 6. The back EMF phase detector BPHD illustrated in FIG. 11 includes amplifier circuits AMP11 and AMP12, a sample hold circuit SH11, a comparator circuit CMP_Z, an up/down counter circuit UDCUNT1, flip-flop circuits FF11-FF13, an AND circuit AD11, and an exclusive OR circuit XOR11.

The amplifier circuit AMP11 amplifies the drive voltage Vu of the u phase with reference to the voltage Vct of the neutral point CT. The sample hold circuit SH11 samples and holds the drive voltage Vu at the prescribed timing. The prescribed timing is generated for every PWM cycle. That is, in each PWM cycle, the prescribed timing is generated in the period when the high-side transistor of one phase of the other two phases (the v phase or the w phase) and the low-side transistor of the other phase are both in an ON state (that is, the period when the voltage Vct becomes a half of the supply voltage VM). The comparator circuit CMP_Z compares the magnitude relation of the output voltage V11 of the sample hold circuit SH11 and the zero cross voltage VthZ (for example, VM/2).

The flip-flop circuits FF11 and FF12 latch the drive voltage detection enable signal CNT_EN1 sequentially in synchronization with the reference clock CLK of the digital control, and output it to the up/down counter circuit UDCUNT1. The exclusive OR circuit XOR11 performs the exclusive OR of the comparison result of the comparator circuit CMP_Z and the detection direction signal DIR of the back electromotive force, and outputs an arithmetic result ZXOUT. The up/down counter circuit UDCUNT1 is enabled in the period when the drive voltage detection enable signal CNT_EN1 is at an 'H' level, and operates in this enabled state, based on the arithmetic result ZXOUT of the exclusive OR circuit XOR11.

In the back EMF phase detection, when the rising back EMF phase of the u phase is detected as shown in FIG. 10, the detection direction signal DIR is set at an 'L' level, and the arithmetic result ZXOUT is kept at an 'L' level until the zero cross of the back electromotive force is detected. When the falling back EMF phase is detected on the other hand, the detection direction signal DIR is set at an 'H' level, and the arithmetic result ZXOUT is kept at an 'L' level until the zero cross of the back electromotive force is detected. This aims at operating the up/down counter circuit UDCUNT1 in a similar manner in detecting the back EMF phase in any direction of rising or falling.

The detection direction signal DIR is generated by the PWM modulator PWMMD as illustrated in FIG. 2. When detecting the back EMF phase in one of rising and falling, the detection direction signal DIR is fixed at an 'L' level or an 'H' level. On the basis of such an arithmetic result ZXOUT, the up/down counter circuit UDCUNT1 performs count-up at the reference clock CLK when the arithmetic result ZXOUT is at an 'H' level, and performs count-down at the reference clock CLK when the arithmetic result ZXOUT is at an 'L' level.

The AND circuit AD11 performs an AND operation by inputting the inverted output of the flip-flop circuit FF11 and the output of the flip-flop circuit FF12. Consequently, the AND circuit AD11 outputs a latch signal LT11 used as a one-shot pulse signal when the drive voltage detection enable signal CNT_EN1 makes a transition from an 'H' level to an 'L' level. The flip-flop circuit FF13 latches the count value of the up/down counter circuit UDCUNT1 by using the latch signal LT11 concerned as a trigger. The amplifier circuit AMP12 amplifies the output of the flip-flop circuit FF13 with the prescribed gain Kconv1 to output the reference voltage phase θbemf. The gain Kconv1 is a coefficient for adjusting the sensitivity of the phase to the count value to the sensitivity in the drive current phase detector IPHD described below.

Figure 12:
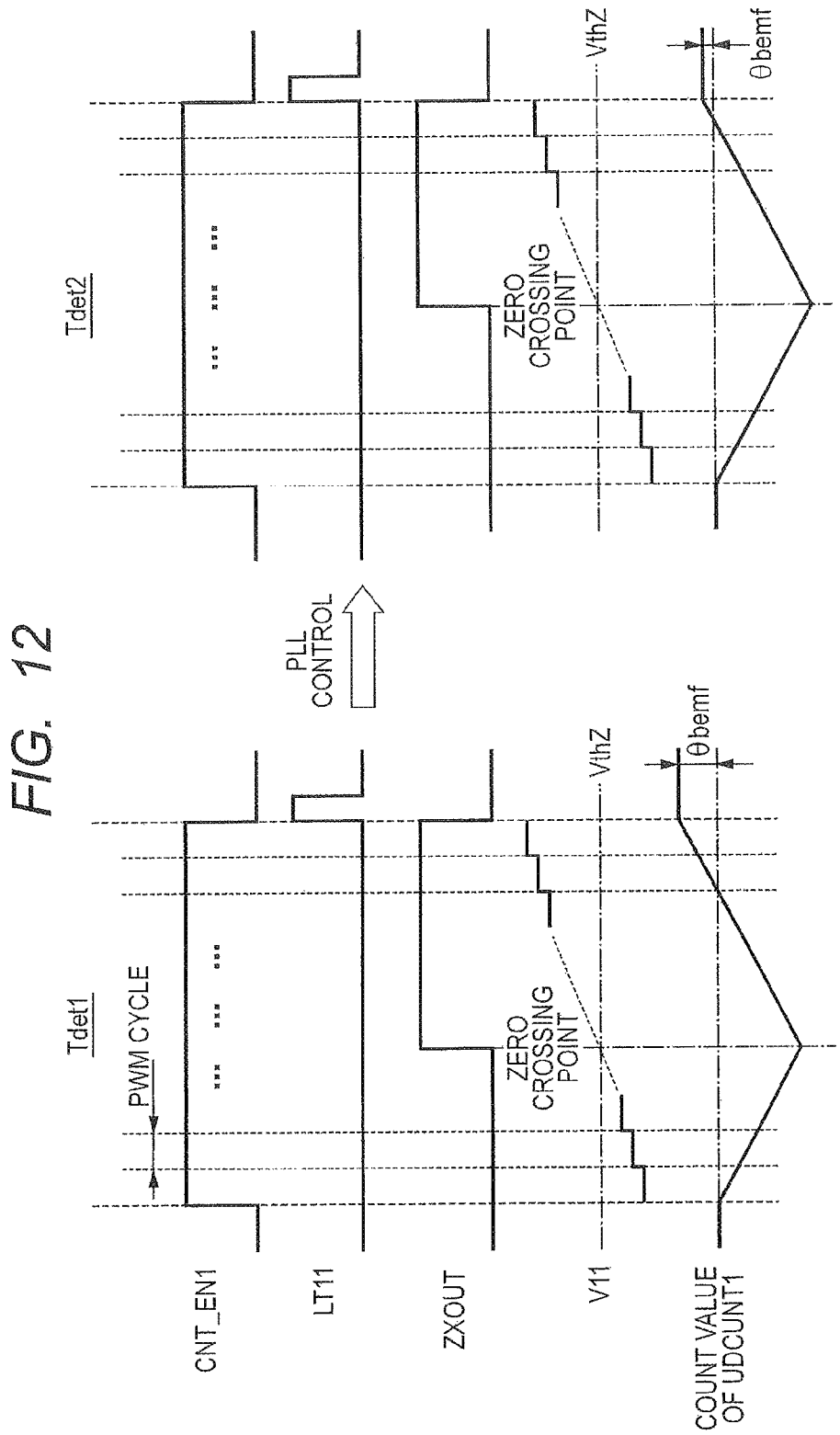
FIG. 12 is an explanatory drawing illustrating an example of operation of the back EMF phase detector illustrated in FIG. 11.

FIG. 12 is an explanatory drawing illustrating an example of operation of the back EMF phase detector illustrated in FIG. 11. As illustrated in FIG. 12, when the drive voltage detection enable signal CNT_EN1 is set to an 'H' level, the up/down counter circuit UDCUNT1 starts a count operation. Here, the output voltage V11 of the sample hold circuit SH11 is smaller than the zero cross voltage VthZ at the start time of the count operation, then reaches the zero cross voltage VthZ, and after that, rises exceeding the zero cross voltage VthZ.

Corresponding to this change, the up/down counter circuit UDCUNT1 performs count-down until the output voltage V11 reaches the zero cross voltage VthZ, that is, until the arithmetic result ZXOUT is set to an 'H' level, and performs count-up after the output voltage V11 exceeds the zero cross voltage VthZ (that is, after the arithmetic result ZXOUT is set to an 'H' level). Then, the up/down counter circuit UDCUNT1 stops the count operation at the time when the drive voltage detection enable signal CNT_EN1 makes a transition to an 'L' level. The back EMF phase detector BPHD determines the reference voltage phase θbemf based on the final count value at the time of stopping the count operation concerned.

In a period Tdet1 illustrated in FIG. 12, the output voltage V11 has reached the zero cross voltage VthZ at time earlier than the time of the halfway point of the 'H' level period of the drive voltage detection enable signal CNT_EN1. As a result, the final count value (the reference voltage phase θbemf) of the up/down counter circuit UDCUNT1 becomes greater than the count value at the start time of the count operation. The reference voltage phase θbemf detected by the present procedure is inputted into the phase correction unit PHCP illustrated in FIG. 6.

Here, the operation of the PLL controller PLLCT illustrated in FIG. 2 is explained. The PLL controller PLLCT performs the PLL control so that the time of the halfway point of the 'H' level period of the drive voltage detection enable signal CNT_EN1 and the time of the zero crossing point may match, and updates the energization control timing. For example, the PLL controller PLLCT advances the phase of the energization control timing in response to the reference voltage phase θbemf detected in the period Tdet1. According to this, the phase of the drive voltage detection enable signal CNT_EN1 outputted from the PLL modulator PWMMD is also advanced.

As a result, as illustrated in a period Tdet2 illustrated in FIG. 12, the time of the zero crossing point approaches the time of the halfway point of the 'H' level period of the drive voltage detection enable signal CNT_EN1. That is, the reference voltage phase θbemf is controlled to approach zero always by the PLL controller PLLCT. In this way, the energization control timing is rendered to be synchronized with the reference voltage phase θbemf.

《Details of the Drive Current Phase Detector》

Figure 13:
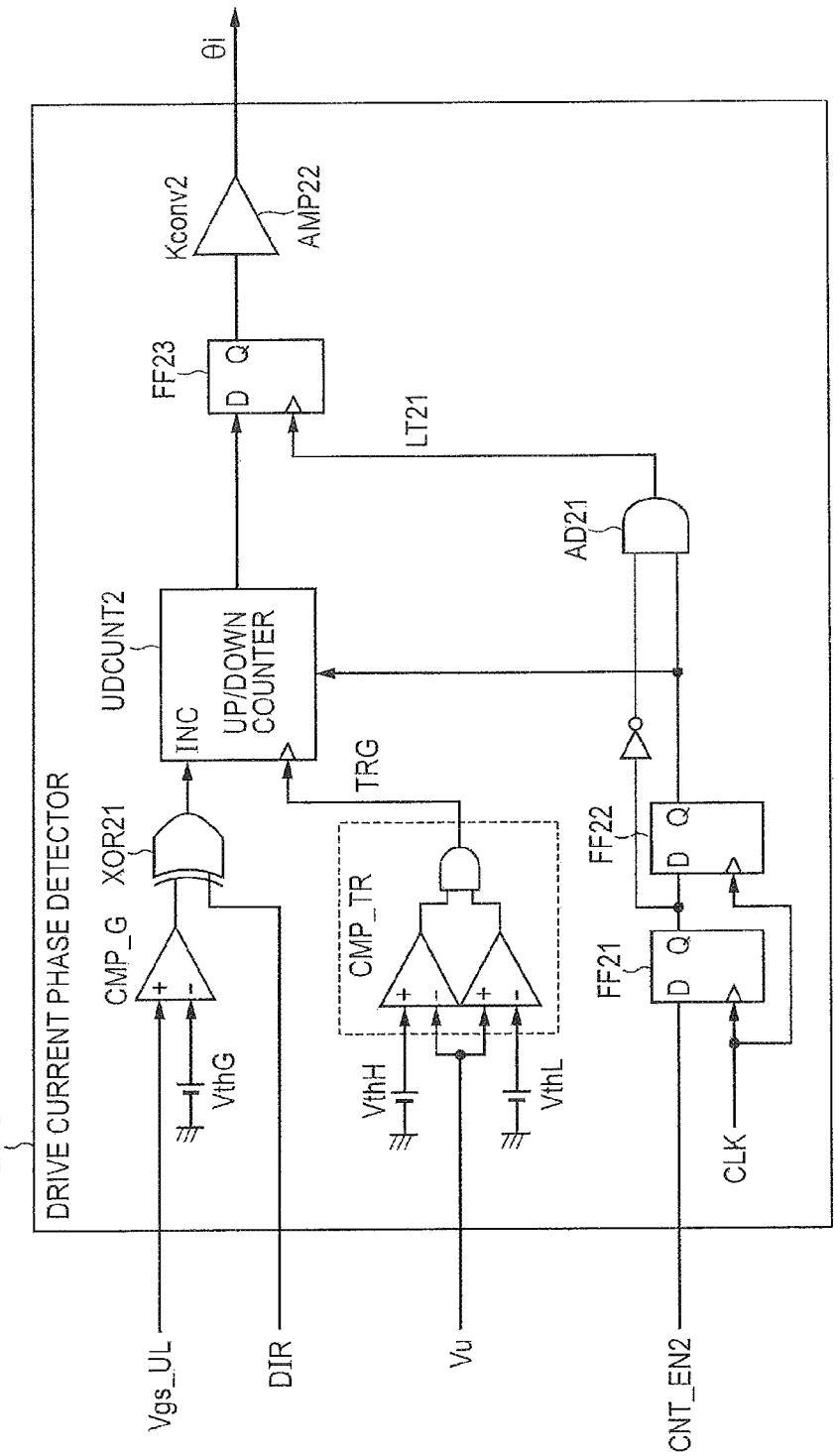
FIG. 13 is a circuit diagram illustrating an example of the detailed configuration of a drive current phase detector illustrated in FIG. 6.

FIG. 13 is a circuit diagram illustrating an example of the detailed configuration of the drive current phase detector illustrated in FIG. 6. The drive current phase detector IPHD illustrated in FIG. 13 includes comparator circuits CMP_G and CMP_TR, an up/down counter circuit UDCUNT2, flip-flop circuits FF21-FF23, an AND circuit AD21, an amplifier circuit AMP22, and an exclusive OR circuit XOR21. The comparator circuit CMP_G compares the magnitude relation of a gate-to-source voltage Vgs_UL of the low-side transistor (M2u illustrated in FIG. 5) corresponding to any one of the phases (here the u phase) of the motor SPM and a prescribed threshold voltage VthG. That is, the comparator circuit CMP_G determines whether the low-side transistor concerned is in an ON state or an OFF state.

The comparator circuit CMP_TR determines whether the voltage at the driving terminal (OUTu illustrated in FIG. 5) of any one of the phases (here the u phase) of the motor SPM is greater than a threshold voltage VthL of the high potential side and smaller than a threshold voltage VthH of the low potential side. That is, the comparator circuit CMP_TR detects the period when the voltage at the driving terminal concerned (the drive voltage Vu) makes a transition between the supply voltage VM of the high potential side and the supply voltage of the low potential side (the ground power supply voltage GND) according to the PWM signal. The comparator circuit CMP_TR outputs a trigger signal TRG used as an 'H' pulse signal in the detected transition period concerned.

The flip-flop circuits FF21 and FF22 latch the drive current detection enable signal CNT_EN2 sequentially in synchronization with the reference clock CLK of the digital control, and output it to the up/down counter circuit UDCUNT2. The up/down counter circuit UDCUNT2 is enabled during the period when the drive voltage detection enable signal CNT_EN2 is at an 'H' level. In this enabled state, the up/down counter circuit UDCUNT2 performs count-down or count-up based on the comparison result of the comparator circuit CMP_G, whenever the trigger signal TRG is outputted. Here, the up/down counter circuit UDCUNT2 performs count-down when Vgs_UL<VthG (when the low-side transistor of the detection target is in an OFF state), and performs count-up when Vgs_UL>VthG (when the low-side transistor of the detection target is in an ON state).

Also in FIG. 13, as is the case with FIG. 11, the arithmetic result by the exclusive OR circuit XOR21 of the comparison result of the comparator circuit CMP_G and the detection direction signal DIR is inputted into the up/down counter circuit UDCUNT2. This aims at operating the up/down counter circuit UDCUNT2 in a similar manner irrespective of the direction of the zero cross of the drive current, as is the case with FIG. 11. When detecting the drive current phase in either direction, the detection direction signal DIR is fixed.

The AND circuit AD21 performs an AND operation by inputting the inverted output of the flip-flop circuit FF21 and the output of the flip-flop circuit FF22. Consequently, the AND circuit AD21 outputs a latch signal LT21 used as a one-shot pulse signal when the drive current detection enable signal CNT_EN2 makes a transition from an 'H' level to an 'L' level. The flip-flop circuit FF23 latches the count value of the up/down counter circuit UDCUNT2 by using the latch signal LT21 concerned as a trigger. The amplifier circuit AMP22 amplifies the output of the flip-flop circuit FF23 with a prescribed gain Kconv2, and outputs the reference current phase θi. The gain Kconv2 is a coefficient for adjusting the sensitivity of the phase to count value to the sensitivity in the back EMF phase detector BPHD described above.

Figure 14:
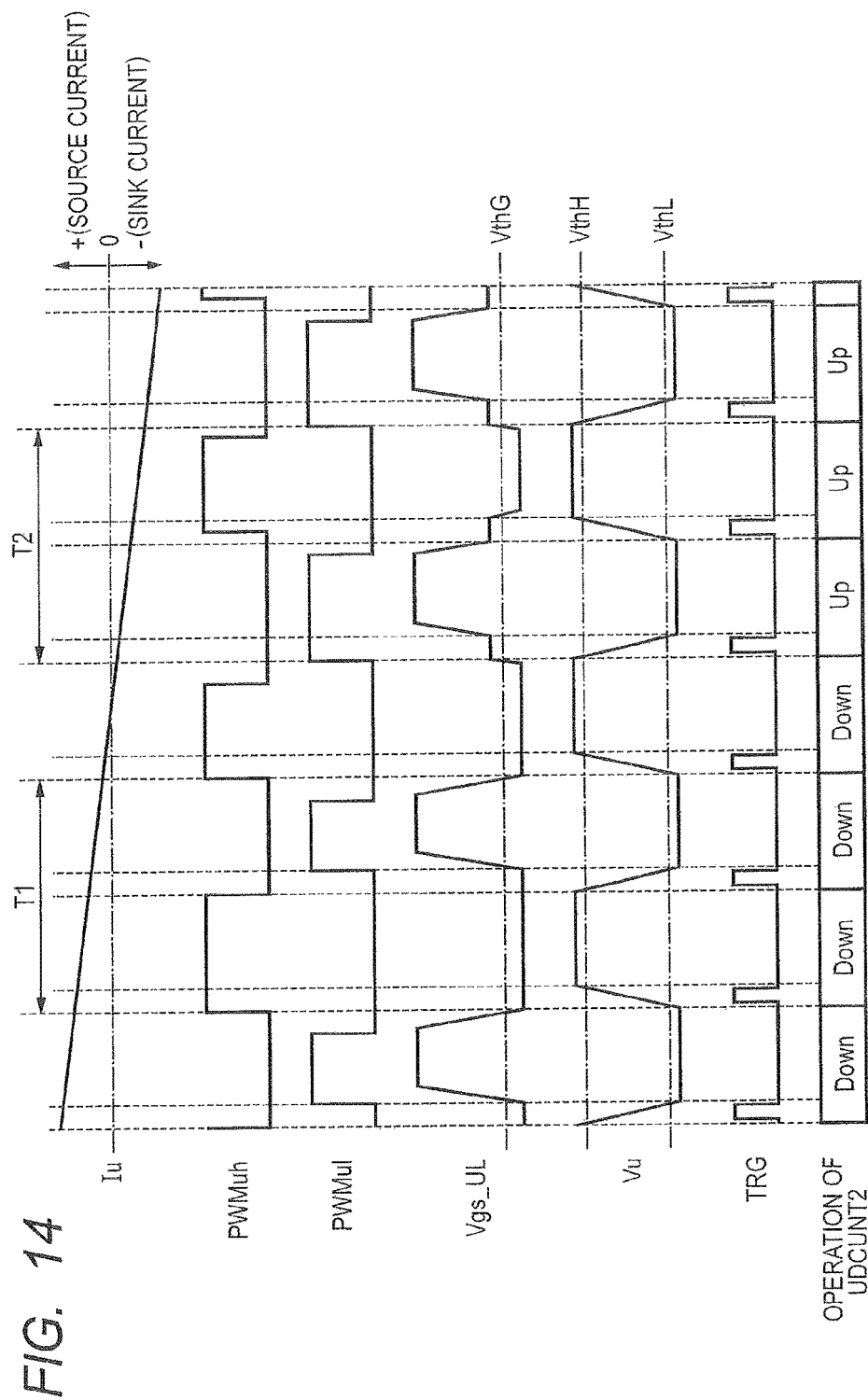
FIG. 14 is a waveform chart illustrating the principle of operation of the drive current phase detector illustrated in FIG. 13.

FIG. 14 is a waveform chart illustrating the principle of operation of the drive current phase detector illustrated in FIG. 13. FIG. 15A is an explanatory drawing illustrating an example of operation of the inverter at the time of source current in FIG. 14. FIG. 15B is an explanatory drawing illustrating an example of operation of the inverter at the time of sink current in FIG. 14. FIG. 15A and FIG. 15B illustrate simply the example of the configuration for two phases (the u phase and the v phase) in the inverter INVBK illustrated in FIG. 5. As illustrated in FIG. 15A and FIG. 15B, in practice, the high-side transistor M1u of each phase (for example, the u phase) includes a body diode D1u, and the low-side transistor M2u also includes a body diode D2u.

FIG. 14 illustrates roughly the operating waveform of each signal at the time of the drive current Iu changing from a source current (plus current) to a sink current (minus current). Here, in the PWM cycle T1 in which the source current flows, the operation as illustrated in FIG. 15A is performed. First, in the period when the PWM signal PWMuh is at an 'H' level (the PWM signal PWMul is at an 'L' level), the high-side transistor M1u of the u phase is driven to an ON state, and the low-side transistor M2u is driven to an OFF state, respectively. In this period, the source current (plus current) flows along the path from the high-side transistor M1u of the u phase to the motor SPM and to the low-side transistor M2v of the v phase in an ON state. Accordingly, the drive voltage Vu of the u phase is at the level near the supply voltage VM.

Next, the PWM signal PWMuh is assumed to have made a transition from an 'H' level to an 'L' level. In this case, the PWM signal PWMul makes a transition to an 'H' level, after maintaining an 'L' level during a period of a dead time. When the PWM signal PWMuh makes a transition from an 'H' level to an 'L' level, the high-side transistor M1u of the u phase makes a transition towards an OFF state. Accordingly, the drive voltage Vu of the u phase makes a transition from the level near the supply voltage VM towards the level near the ground power supply voltage GND.

When the level of the drive voltage Vu falls lower than the level of the ground power supply voltage GND, a regenerative current (plus current) flows in the path from the motor SPM, to the low-side transistor M2v of the v phase in an ON state, and to the body diode D2u on the low side of the u phase. Here, the high-side transistor M1u cannot make a transition to the perfect OFF state until the regenerative current begins to flow. As a result, in the transition period of the drive voltage Vu, the high-side transistor M1u of the u phase becomes in an ON state, and the low-side transistor M2u becomes in an OFF state due to the dead time. That is, the gate-to-source voltage Vgs_UL of the low-side transistor M2u becomes smaller than the prescribed threshold voltage VthG.

Subsequently, when the regenerative current (plus current) begins to flow, the high-side transistor M1u becomes in an OFF state completely, the dead time is released, and the PWM signal PWMul makes a transition from an 'L' level to an 'H' level. Accordingly, the gate-to-source voltage Vgs_UL of the low-side transistor M2u of the u phase becomes greater than the prescribed threshold voltage VthG, and the low-side transistor M2u concerned becomes in an ON state. The path of the regenerative current changes from the side of the body diode D2u to the side of the low-side transistor M2u.

Next, the PWM signal PWMul is assumed to have made a transition from an 'H' level to an 'L' level. In this case, when the low-side transistor M2u of the u phase makes a transition towards an OFF state and completely becomes in an OFF state (that is, when the PWM signal PWMul becomes smaller than the prescribed threshold voltage VthG), the path of the regenerative current returns to the side of the body diode D2u, and the dead time is released. In response to this, the PWM signal PWMuh makes a transition from an 'L' level to an 'H' level and the high-side transistor M1u of the u phase is driven to an ON state. As a result, the drive voltage Vu makes a transition from the level near the ground power supply voltage GND to the level near the supply voltage VM.

As described above, in the PWM cycle T1 in which the drive current Iu is the source current (plus current), during the period when the drive voltage Vu makes a transition between the level near the supply voltage VM and the level near the ground power supply voltage GND, the gate-to-source voltage Vgs_UL of the low-side transistor M2u becomes smaller than the prescribed threshold voltage VthG. That is, the low-side transistor M2u becomes in an OFF state.

On the other hand, in the PWM cycle T2 in FIG. 14 in which the sink current flows, the operation as illustrated in FIG. 15B is performed. First, in the period when the PWM signal PWMul is at an 'H' level (the PWM signal PWMuh is at an 'L' level), the low-side transistor M2u of the u phase is driven to an ON state, and the high-side transistor M1u is driven to an OFF state, respectively. In this period, the sink current (minus current) flows along the path from the high-side transistor M1v of the v phase in an ON state, to the motor SPM, and to the low-side transistor M2u of the u phase. Accordingly, the drive voltage Vu of the u phase is at the level near the ground power supply voltage GND.

Next, the PWM signal PWMul is assumed to have made a transition from an 'H' level to an 'L' level. In this case, the PWM signal PWMuh makes a transition to an 'H' level, after maintaining an 'L' level during a period of a dead time. When the PWM signal PWMul makes a transition from an 'H' level to an 'L' level, the low-side transistor M2u of the u phase makes a transition towards an OFF state. Accordingly, the drive voltage Vu of the u phase makes a transition from the level near the ground power supply voltage GND towards the level near the supply voltage VM.

When the level of the drive voltage Vu rises higher than the level of the supply voltage VM, a regenerative current (minus current) flows along the path from the motor SPM, to the body diode D1u on the high side of the u phase, and to the high-side transistor M1v of the v phase in an ON state. Here, the low-side transistor M2u cannot make a transition to the perfect OFF state until the regenerative current begins to flow. As a result, in the transition period of the drive voltage Vu, the low-side transistor M2u of the u phase becomes in an ON state, and the high-side transistor M1u becomes in an OFF state due to the dead time. That is, the gate-to-source voltage Vgs_UL of the low-side transistor M2u becomes greater than the prescribed threshold voltage VthG.

Subsequently, when the regenerative current (minus current) begins to flow, the low-side transistor M2u becomes in an OFF state completely, the dead time is released, and the PWM signal PWMuh makes a transition from an 'L' level to an 'H' level. Accordingly, the high-side transistor M1u of the u phase becomes in an ON state and the path of the regenerative current changes from the side of the body diode D1u to the side of the high-side transistor M1u.

Next, the PWM signal PWMuh is assumed to have made a transition from an 'H' level to an 'L' level. In this case, when the high-side transistor M1u of the u phase makes a transition towards an OFF state and becomes completely in an OFF state, the path of the regenerative current returns to the side of the body diode D1u, and the dead time is released. In response to this, the PWM signal PWMul makes a transition from an 'L' level to an 'H' level and the low-side transistor M2u of the u phase is driven to an ON state. That is, the gate-to-source voltage Vgs_UL of the low-side transistor M2u becomes greater than the prescribed threshold voltage VthG. Accordingly, the drive voltage Vu makes a transition from the level near the supply voltage VM towards the level near the ground power supply voltage GND.

As described above, in the PWM cycle T2 in which the drive current Iu is the sink current (minus current), during the period when the drive voltage Vu makes a transition between the level near the supply voltage VM and the level near the ground power supply voltage GND, the gate-to-source voltage Vgs_UL of the low-side transistor M2u becomes greater than the prescribed threshold voltage VthG. That is, the low-side transistor M2u becomes in an ON state.

In this way, the drive current phase detector IPHD illustrated in FIG. 13 determines whether the low-side transistor M2u is in an ON state or in an OFF state, in the period when the drive voltage Vu of any one of the phases (here the u phase) of the motor SPM makes a transition. Consequently, the drive current phase detector IPHD determines whether the current of the phase concerned is a source current (a plus current) or a sink current (a minus current). Then, the drive current phase detector IPHD concerned detects the time of changing from one of the source current and the sink current to the other as the zero crossing point of the drive current Iu.

Specifically, as illustrated in FIG. 14, the up/down counter circuit UDCUNT2 of the drive current phase detector IPHD performs count-down when the determination is the source current, and performs count-up when the determination is the sink current. Although omitted in FIG. 14, as is the case with FIG. 12, the up/down counter circuit UDCUNT2 performs such a count operation in the period when the drive current detection enable signal CNT_EN2 is at an 'H' level. As a result, as is the case with FIG. 12, the drive current phase detector IPHD can determine the reference current phase θi, based on the final count value at the time when the drive current detection enable signal CNT_EN2 makes a transition to an 'L' level.

As described above, by employing the motor driving device and the motor system according to Embodiment 1, it becomes possible to optimize the phase of the drive current of a motor, representatively.

Embodiment 2

«The Configuration and Operation of the Principal Part of a Motor Driving Device (Modified Example)»

Figure 16:
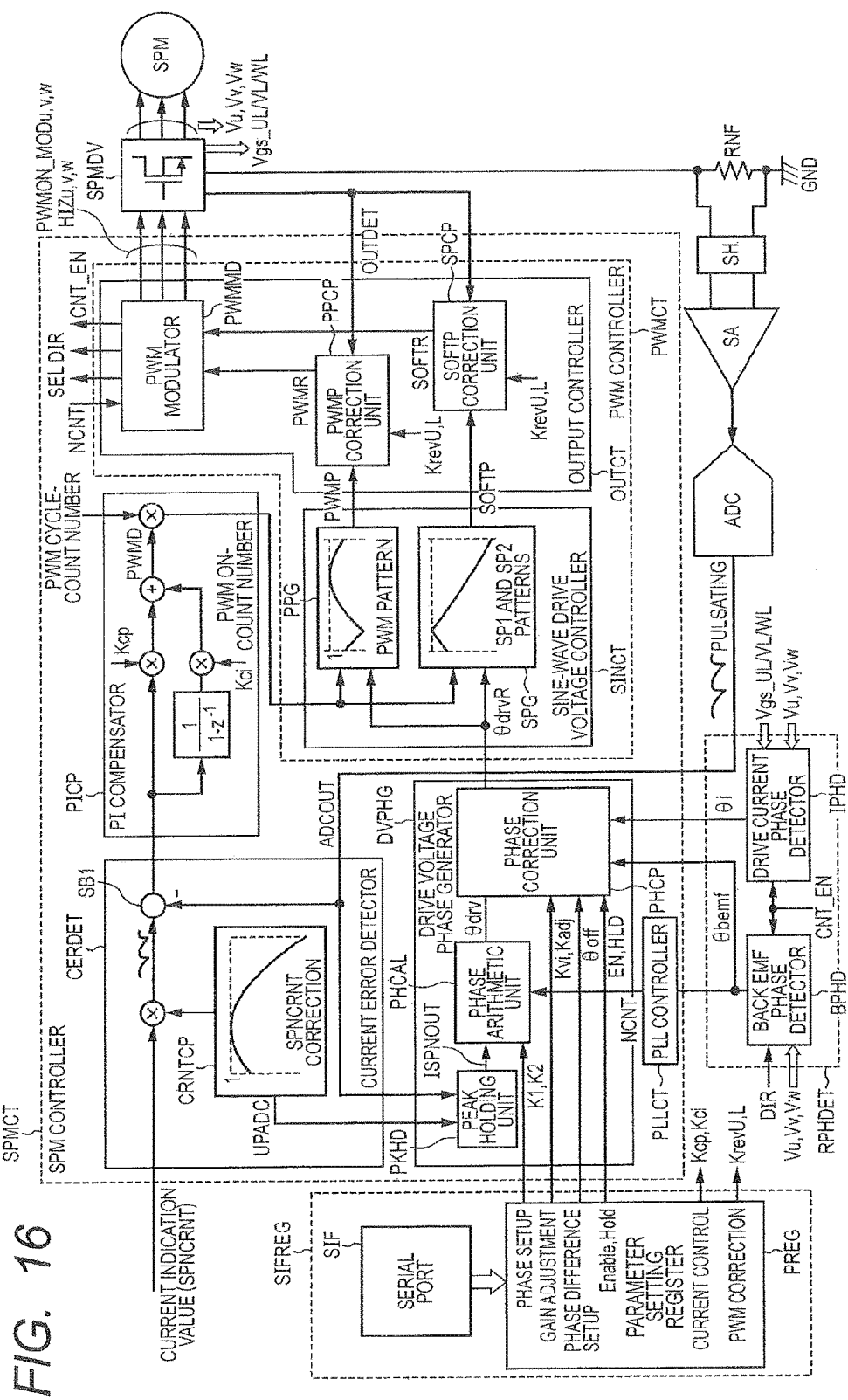
FIG. 16 is a functional block diagram illustrating an example of the configuration of a principal part of a motor driving device according to Embodiment 2 of the present invention.

FIG. 16 is a functional block diagram illustrating an example of the configuration of the principal part of a motor driving device according to Embodiment 2 of the present invention. The motor driving device illustrated in FIG. 16 is different from the motor driving device illustrated in FIG. 2 in that the parameter setting register PREG further holds a phase difference setting value θoff and a hold signal HLD. The phase difference setting value θoff and the hold signal HLD are inputted into the phase correction unit PHCP.

The phase correction unit PHCP stops updating of the correction value responding to the hold signal HLD, and holds the newest correction value. According to this configuration, for example, at the time of activation of the motor SPM, or in the prescribed period set in advance, the optimal correction value is determined by the phase correction unit PHCP, and then the hold signal HLD is asserted to an 'H' level. Consequently, it becomes unnecessary to provide the non-energization period as illustrated in FIG. 10, in order to detect the phase of the back electromotive force Vbemf.

According to this configuration, it is possible to drive the motor SPM by means of the drive current of a sine wave without the distortion accompanying the non-energization period. As a result, it is possible to reduce the torque ripple which may occur in the non-energization period, and it is possible to maintain the low vibration and the noise reduction of the motor SPM. Note that, when such a configuration is employed, it becomes impossible to detect the phase of the back electromotive force Vbemf. Accordingly, it may become difficult to generate the energization control timing of the motor SPM by the PLL controller PLLCT.

However, as described in Embodiment 1, it is possible to detect the reference current phase θi without providing the non-energization period. The reference current phase θi is defined so as to have a prescribed phase difference (zero in Embodiment 1) with reference to the reference voltage phase θbemf, in the period of the hold signal HLD being at an 'L' level. Accordingly, in Embodiment 2, the PLL controller PLLCT is configured so as to generate the energization control timing of the motor SPM based on the reference current phase θi instead of the reference voltage phase θbemf, after the hold signal HLD is asserted to an 'H' level. Specifically, as is the case with FIG. 12, the PLL controller PLLCT performs the PLL control so that the zero crossing point of the drive current may be settled at the middle time of the period when the drive current detection enable signal CNT_EN2 is at an 'H' level.

The phase difference setting value θoff is a setting value to set the phase difference between the reference voltage phase θbemf and the reference current phase θi to a prescribed value such as non-zero. For example, as in the field-weakening control, the method in which the maximum of the angular velocity of the motor SPM is raised by daringly advancing the reference current phase θi more than the reference voltage phase θbemf is known. Also, as in a reluctance motor, the method in which torque is obtained by performing the phase lead control is known. In such a case, it is useful to adopt the configuration in which the phase difference setting value θoff can be set from the exterior, as shown in FIG. 16.

«Details of the Phase Arithmetic Unit and the Phase Correction Unit (Modified Example)»

Figure 17:
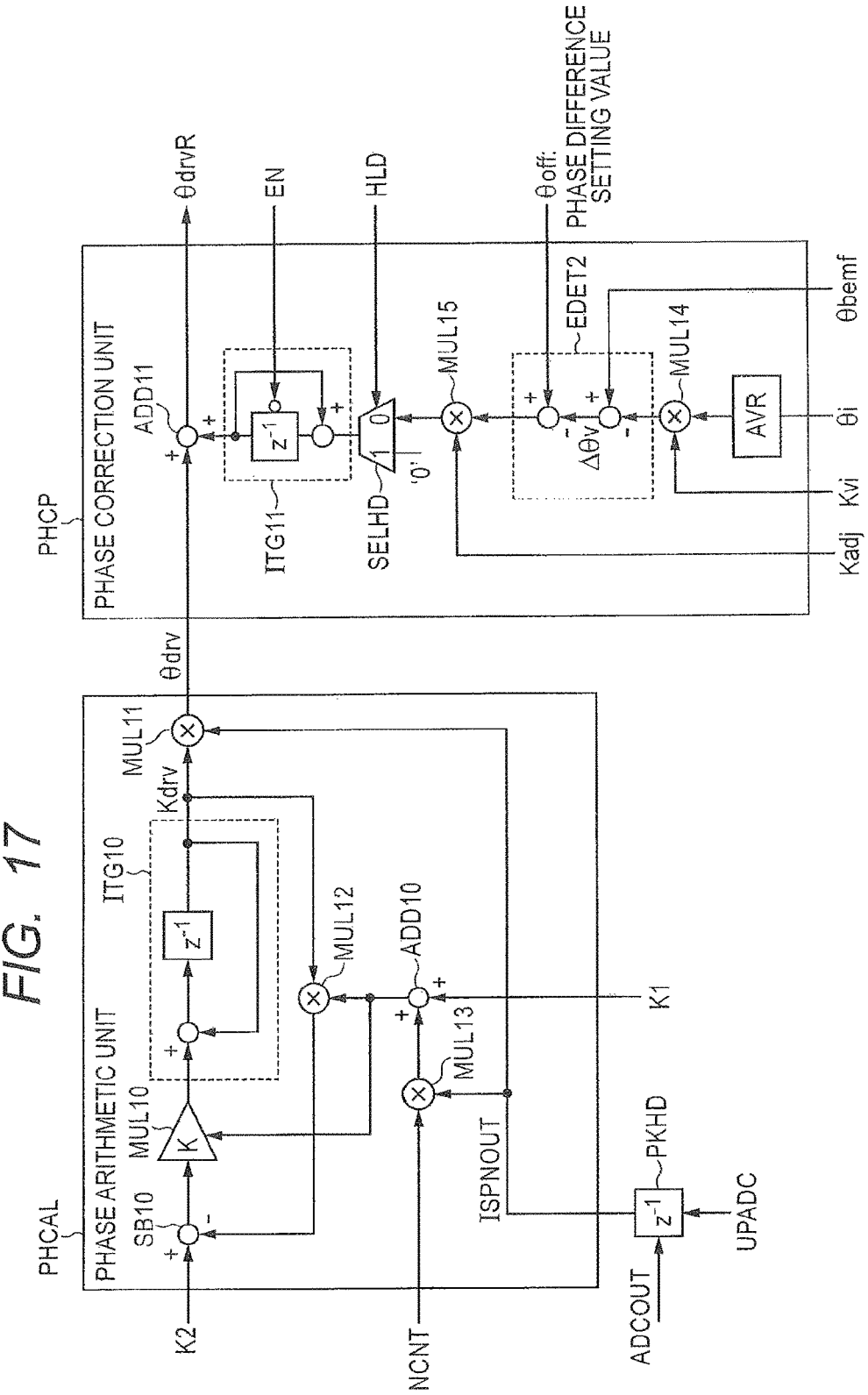
FIG. 17 is a block diagram illustrating an example of the detailed configuration of a phase arithmetic unit and a phase correction unit in a drive voltage phase generator illustrated in FIG. 16.

FIG. 17 is a block diagram illustrating an example of the detailed configuration of the phase arithmetic unit and the phase correction unit in the drive voltage phase generator illustrated in FIG. 16. The example of the configuration illustrated in FIG. 17 is slightly different from the example of the configuration illustrated in FIG. 8 in the configuration of the phase correction unit PHCP. Specifically, the phase correction unit PHCP illustrated in FIG. 17 is different in the configuration of the error detector EDET2 and in the point that a selector circuit SELHD is added, as compared with the example of the configuration illustrated in FIG. 8.

As is the case with FIG. 8, the error detector EDET2 calculates the phase difference between the reference voltage phase θbemf and the multiplication result of the multiplier MUL14 corresponding to the reference current phase θi, and furthermore detects the error between the calculated phase difference concerned and the phase difference setting value θoff. The multiplier MUL15 multiplies the gain adjustment parameter (that is, the integration gain) Kadj to the detection result of the error detector EDET2 concerned. The selector circuit SELHD outputs the multiplication result of the multiplier MUL15 to the integrator ITG11 when the hold signal HLD is at an 'L' level, and outputs the value of zero to the integrator ITG11 when the hold signal HLD is at an 'H' level.

According to such a configuration, the feedback control is performed so as to converge the phase difference between the reference voltage phase θbemf and the reference current phase θi to the phase difference setting value θoff, in the period when the hold signal HLD is at an 'L' level. On the other hand, after the hold signal HLD is asserted to an 'H' level, the correction value from the integrator ITG11 is fixed. After the hold signal HLD is asserted to an 'H' level, the PLL controller PLLCT described above generates the energization control timing based on the reference current phase θi and the phase difference setting value θoff.

Figure 18:
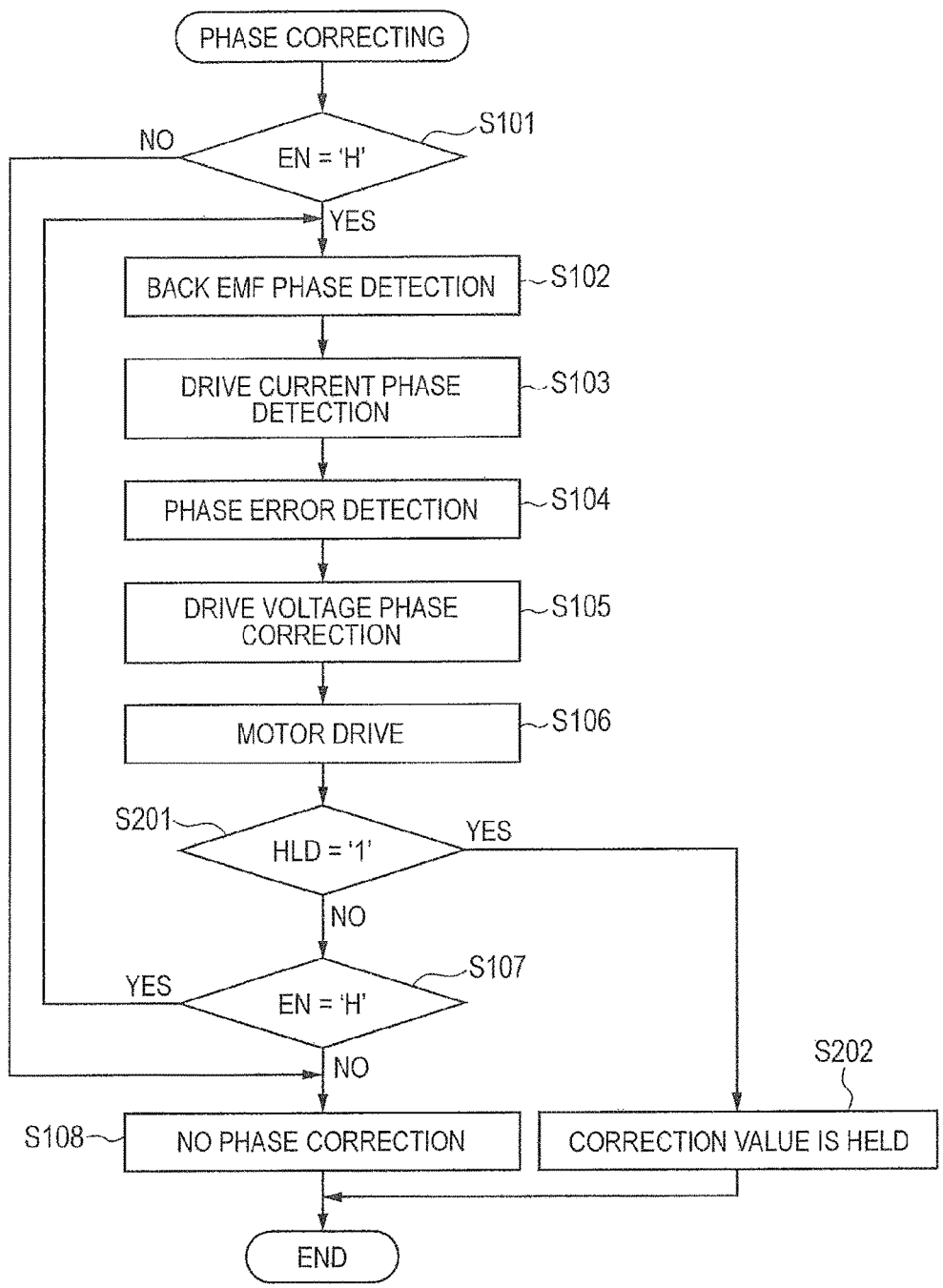
FIG. 18 is a flow chart illustrating an example of an entire operation of a phase correction unit illustrated in FIG. 17.

FIG. 18 is a flow chart illustrating an example of the entire operation of the phase correction unit illustrated in FIG. 17. The flow illustrated in FIG. 18 is added with Step S201 and Step S202, as compared with the flow illustrated in FIG. 7. Step S201 is inserted between Step S106 and Step S107 described above. The phase correction unit PHCP determines whether the hold signal HLD is at an 'H' level (Step S201), after the drive of the motor SPM is performed in the condition that the correction value is updated (Step S106).

When the hold signal HLD is at an 'H' level, the phase correction unit PHCP holds the newest correction value and terminates the processing (Step S202). When the hold signal HLD is at an 'L' level, on the other hand, the phase correction unit PHCP determines the enabling setting signal EN, as is the case with FIG. 7. When the enabling setting signal EN is determined to be in the enabled state, the processing at Steps S102-S106 is repeatedly executed (Step S107). When the enabling setting signal EN is determined to be in the disabled state, the phase correction unit PHCP terminates the processing, without performing the phase correction (that is, setting the correction value to zero) (Step S108). According to this processing, for example, when the correction is necessary again after the newest correction value is held in the phase correction unit PHCP, it is possible to direct the resumption of the correction to the phase correction unit PHCP by controlling the hold signal HLD at an 'L' level anew.

As described above, by employing the motor driving device and the motor system according to Embodiment 2, it becomes possible to optimize the phase of the drive current of the motor, representatively, as is the case with Embodiment 1. As compared with the case of Embodiment 1, it is not necessary to always provide the non-energization period; accordingly, it is possible to attain the low vibration and the noise reduction of the motor.

Embodiment 3

«Details of a Back EMF Phase Detector (Modified Example)»

Figure 19:
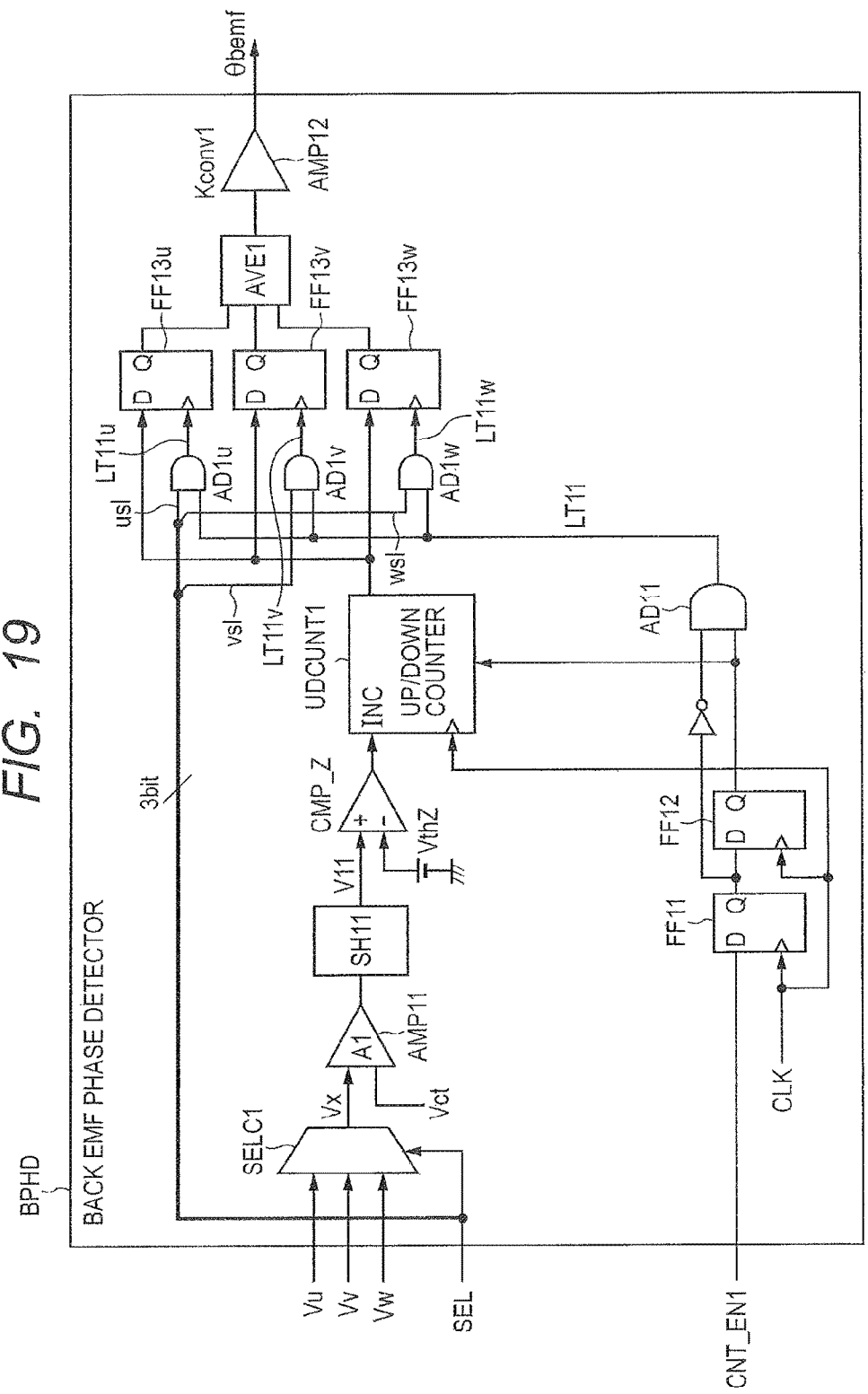
FIG. 19 is a circuit diagram illustrating an example of the configuration of a back EMF phase detector of a motor driving device according to Embodiment 3 of the present invention.

FIG. 19 is a circuit diagram illustrating an example of the configuration of a back EMF phase detector of a motor driving device according to Embodiment 3 of the present invention. The back EMF phase detector BPHD illustrated in FIG. 19 is different from the example of the configuration illustrated in FIG. 11 in the point that a selector circuit SELC1, AND circuits AD1u, AD1v, and AD1w, and an averaging circuit AVE1 are added. The back EMF phase detector BPHD is further different from the back EMF phase detector BPHD illustrated in FIG. 11 in the point that the flip-flop circuit FF13 illustrated in FIG. 11 is replaced with three flip-flop circuits FF13u, FF13v, and FF13w. In FIG. 19, the exclusive OR circuit XOR11 illustrated in FIG. 11 is omitted for the sake of the simplification of the drawing.

The selector circuit SELC1 selects one of the three-phase drive voltages Vu, Vv, and Vw based on the selection signal SEL, and outputs it to the amplifier circuit AMP11 as the drive voltage Vx. That is, in the example of the configuration illustrated in FIG. 11, the phase of the motor SPM used as the detection target of the reference voltage phase θbemf is the u phase. However, in the example of the configuration illustrated in FIG. 19, the phase of the motor SPM concerned can be selected by the selector circuit SELC1. The selection signal SEL is generated by the PWM modulator PWMMD illustrated in FIG. 2, for example.

Here, it is assumed that selection signal SEL is comprised of 3-bit selection signals usl, vsl, and wsl to select the u phase, the v phase, and the w phase, respectively, for convenience of explanation. The AND circuits AD1u, AD1v, and AD1w respectively perform an AND operation of two inputs of the selection signals usl, vsl, and wsl, and the latch signal LT11 from the AND circuit AD11, and output the latch signals LT11u, LT11v, and LT11w to the flip-flop circuits FF13u, FF13v, and FF13w.

The flip-flop circuits FF13u, FF13v, and FF13w latch the count value from the up/down counter circuit UDCUNT1 in response to the latch signals LT11u, LT11v, and LT11w, respectively. The averaging circuit AVE1 averages each output value of the flip-flop circuits FF13u, FF13v, and FF13u. The amplifier circuit AMP12 amplifies the output of the averaging circuit AVE1 with the prescribed gain Kconv1 and outputs the reference voltage phase θbemf.

When the selection signal usl for the u phase is asserted to an 'H' level in such a configuration, as is the case of FIG. 11, the final count value accompanying the transition of the back EMF detection enable signal CNT_EN1 to an 'L' level is latched by the flip-flop circuit FF13u. Similarly, when each of the selection signals vsl and wsl for the v phase and for the w phase is asserted to an 'H' level, respectively, the final count value is latched by the flip-flop circuits FF13v and FF13w, respectively. As a result, it becomes possible that the back EMF phase detector BPHD detects the reference voltage phase θbemf for every phase by switching sequentially the phases of the motor SPM as the detection target via the selector circuit SELC1 for example, and that the averaging circuit AVE1 averages the detected reference voltage phase θbemf concerned for every phase.

«Details of a Drive Current Phase Detector (Modified Example)»

Figure 20:
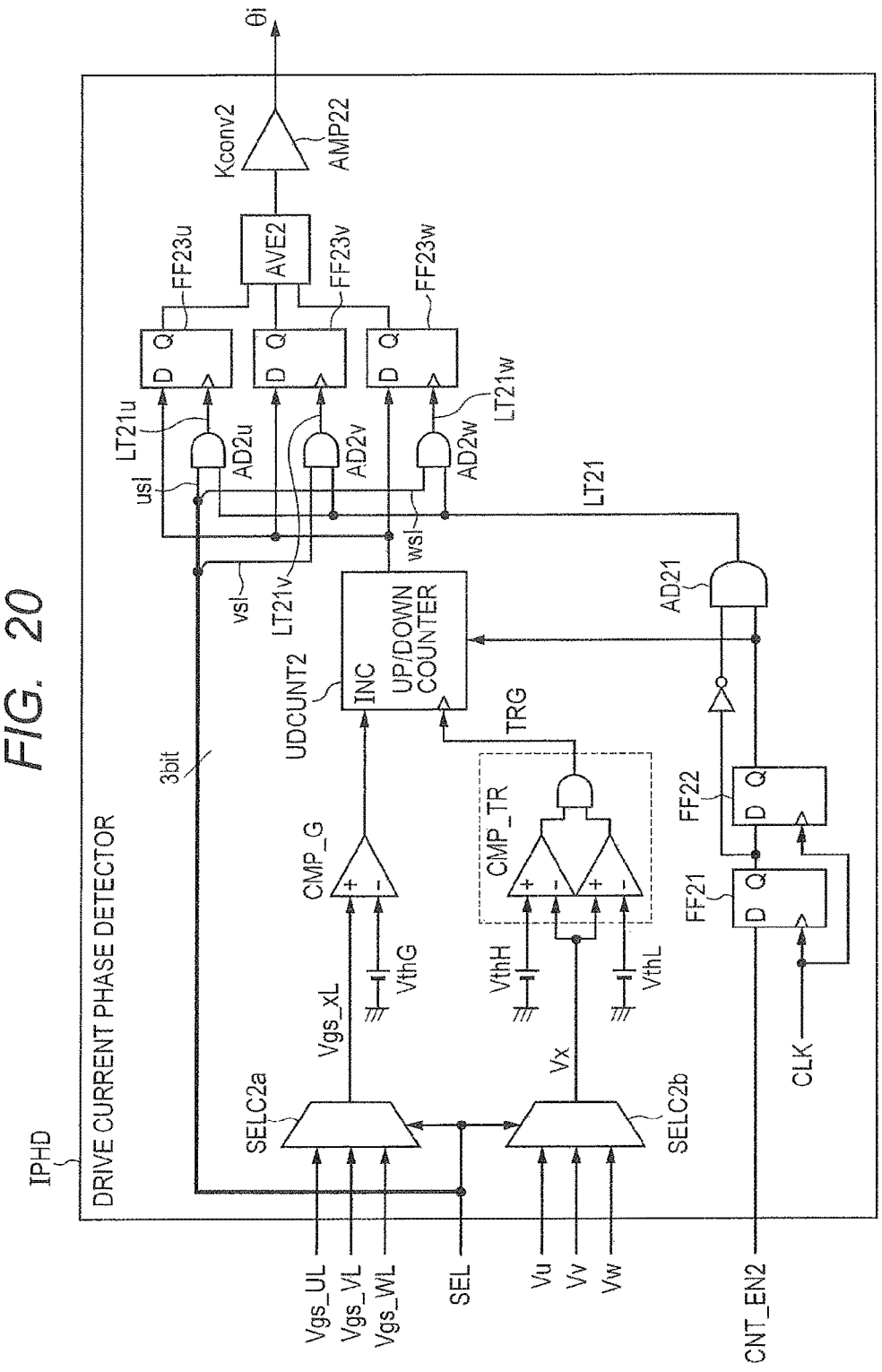
FIG. 20 is a circuit diagram illustrating an example of the configuration of a drive current phase detector of the motor driving device according to Embodiment 3 of the present invention.

FIG. 20 is a circuit diagram illustrating an example of the configuration of a drive current phase detector of the motor driving device according to Embodiment 3 of the present invention. The drive current phase detector IPHD illustrated in FIG. 20 is different from the example of the configuration illustrated in FIG. 13 in the point that selector circuits SELC2a and SELC2b, AND circuits AD2u, AD2v, and AD2w, and an averaging circuit AVE2 are added. The drive current phase detector IPHD concerned is further different from the one illustrated in FIG. 13 in that the flip-flop circuit FF23 illustrated in FIG. 13 is replaced with three flip-flop circuits FF23u, FF23v, and FF23w. In FIG. 20, the exclusive OR circuit XOR21 illustrated in FIG. 13 is omitted for the sake of the simplification of the drawing.

The selector circuit SELC2a selects one of the three-phase gate-to-source voltages Vgs_UL, Vgs_VL, and Vgs_WL, based on the selection signal SEL, and outputs it to the comparator circuit CMP_G as a gate-to-source voltage Vgs_xL. Similarly, the selector circuit SELC2b selects one of the three-phase drive voltages Vu, Vv, or Vw, based on the selection signal SEL, and outputs it to the comparator circuit CMP_TR as a drive voltage Vx. That is, in the example of the configuration illustrated in FIG. 13, the phase of the motor SPM used as the detection target of the reference current phase θi is the u phase. However, in the example of the configuration illustrated in FIG. 20, it is possible to select the phase of the motor SPM concerned by the selector circuits SELC2a and SELC2b.

It is assumed that the selection signal SEL is the same as that of the case of FIG. 19. The AND circuits AD2u, AD2v, and AD1w respectively perform an AND operation of two inputs of the selection signals usl, vsl, and wsl, and the latch signal LT21 from the AND circuit AD21, and output latch signals LT21u, LT21v, and LT21w to the flip-flop circuits FF23u, FF23v, and FF23w.

The flip-flop circuits FF23u, FF23v, and FF23w latch the count value from the up/down counter circuit UDCUNT2 in response to the latch signals LT21u, LT21v, and LT21w, respectively. The averaging circuit AVE2 average each output value of the flip-flop circuits FF23u, FF23v, and FF23w. The amplifier circuit AMP22 amplifies the output of the averaging circuit AVE2 with the prescribed gain Kconv2 and outputs the reference current phase θi.

In this way, the drive current phase detector IPHD illustrated in FIG. 20 has the same phase selection function as the drive voltage phase detector BPHD illustrated in FIG. 19, and operates as is the case with FIG. 19. As a result, it becomes possible that the drive current phase detector IPHD concerned detects the reference current phase θi for every phase by switching sequentially the phases of the motor SPM as the detection target via the selector circuits SELC2a and SELC2b for example, and that the averaging circuit AVE2 averages the detected reference current phase θi concerned for every phase.

The following method is considerable as a concrete sequence. That is, the reference voltage phase θbemf and the reference current phase θi are first detected for the u phase, for example. Next, the detection for the v phase and the detection for the w phase are performed sequentially. Subsequently, the sequence returns to the u phase again, thereby repeating a series of the sequence. In this case, it is possible to equivalently obtain the correction value which brings the phase difference between the mean value of the reference voltage phase θbemf for three phases and the mean value of the reference current phase θi for three phases close to a prescribed value. As a result, it becomes possible to perform the correction including the correction for the magnetization variations among three phases, for example. The sequence is not restricted to what is described above particularly, however, various sequences can be employed. Even when any sequence is employed, it becomes possible to obtain an average correction value by performing the control so as to switch each phase properly with the selector circuit.

In the above, in addition to various kinds of effects described in Embodiment 1 and Embodiment 2, by employing the motor driving device and the motor system according to Embodiment 3, it becomes possible further to optimize the phase of the drive current in each phase of the motor on the average.

As described above, the invention accomplished by the present inventors has been concretely explained based on the embodiments. However, the present invention is not restricted to the embodiments as described above, and it can be changed variously in the range which does not deviate from the gist. For example, the embodiments described above are explained in detail, in order to explain the present invention plainly, and the present invention is not necessarily restricted to one that includes all the explained configurations. It is possible to replace some configuration of a certain embodiment with the configuration of other embodiment, and it is also possible to add the configuration of other embodiment to the configuration of a certain embodiment. It is also possible to make addition, deletion, and substitution of other configurations to some configuration of each embodiment.

For example, the method of the present embodiment can be applied as a drive method of various kinds of motors including not only a HDD device but a DVD player/recorder and a Blu-ray player/recorder.

What is claimed is:

1. A motor driving device to drive a motor provided externally, the motor driving device comprising:
    an inverter which includes a plurality of high-side transistors and low-side transistors respectively coupled to a driving terminal of each phase of the motor and which applies a drive voltage to the motor based on a PWM signal;
    a back EMF (electromotive force) phase detector which detects a reference voltage phase used as a phase of a back electromotive force of the motor;
    a drive current phase detector which detects a reference current phase used as a phase of a drive current of the motor;
    a PWM controller which receives an energization control timing synchronized with the reference voltage phase and generates the PWM signal to control the drive voltage to a sine wave shape; and
    a drive voltage phase generator which determines a first phase used as the phase of the drive voltage necessary to set e phase difference between the reference voltage phase and the reference current phase to a prescribed value, and which directs the PWM controller to shift the energization control timing based on the first phase,
    wherein the drive voltage phase generator comprises:
    a phase arithmetic circuit which calculates a second phase used as a phase of the drive voltage to reduce the phase difference between the reference voltage phase and the reference current phase to zero substantially, based on an arithmetic expression using a current value of the drive current, an angular frequency of the motor, and a predetermined characteristic constant of the motor; and a phase correction circuit which determines the first phase by adding a correction value to the second phase, and which inputs the reference voltage phase and the reference current phase to update the magnitude of the correction value by a feedback control so as to converge the phase difference between the reference voltage phase and the reference current phase to the prescribed value.

2. The motor driving device according to claim 1, wherein the prescribed value is zero.

3. The motor driving device according to claim 1, wherein the phase correction circuit stops updating of the correction value responding to a hold signal and holds the newest correction value.

4. The motor driving device according to claim 1, wherein the phase correction circuit comprises:
a multiplier which multiplies a prescribed conversion factor to one of the reference voltage phase and the reference current phase;
an error detector which calculates the phase difference between the multiplication result of the multiplier and the other one of the reference voltage phase and the reference current phase, and detects an error between the calculated phase difference and the prescribed value;
an integrator which calculates the correction value by integrating the detection result of the error detector; and
an adder which adds the correction value calculated by the integrator to the second phase.

5. The motor driving device according to claim 1, wherein the back EMF phase detector comprises a first selector to select a phase of the motor used as a detection target of the reference voltage phase, and
wherein the drive current phase detector comprises a second selector to select a phase of the motor used as a detection target of the reference current phase.

6. The motor driving device according to claim 5, wherein the back EMF phase detector further comprises a first averaging circuit, detects the reference voltage phase for every phase by switching sequentially the phase of the motor used as the detection target via the first selector, and averages the reference voltage phase detected for every phase by the first averaging circuit, and
wherein the drive current phase detector further comprises a second averaging circuit, detects the reference current phase for every phase by switching sequentially the phase of the motor used as the detection target via the second selector, and averages the reference current phase detected for every phase by the second averaging circuit.

7. The motor driving device according to claim 1, wherein the inverter applies a drive voltage to the motor according to a 180-degree energization system,
wherein the back EMF phase detector detects a zero crossing point of the back electromotive force in a non-energization period which is a period smaller than 60 degrees provided in advance within the 360-degree energization period and set up in advance to stop the energization, and
wherein the drive current phase detector detects a zero crossing point of the drive current in the energization period which is different in phase by 180 degrees from the non-energization period.

8. The motor driving device according to claim 7, wherein the drive current phase detector detects a period in which a voltage at the driving terminal of one of the phases of the motor makes a transition between a high-potential-side power supply voltage and a low-potential-side power supply voltage responding to the PWM signal, and detects the zero crossing point of the drive current by determining whether the low-side transistor corresponding to the one of the phases is in an ON state or in an OFF state in the detected transition period.

9. The motor driving device according to claim 1, wherein, defining that a variable proportional to a current value of the drive current is "ISPNOUT", a variable inversely proportional to an angular frequency of the motor is "NCNT", and the characteristic constants of the motor are "K1" and "K2", the phase arithmetic circuit comprises:
a first arithmetic circuit to calculate "Kdrv=K2/(K1+NCNT·ISPNOUT)"; and
a second arithmetic circuit to calculate the second phase by multiplying "ISPNOUT" to "Kdrv".

10. The motor driving device according to claim 9, wherein the first arithmetic circuit calculates "Kdrv" by performing a feedback control of "Kdrv" so as to converge to zero an error between "K2" and the result of multiplying "(K1+NCNT·ISPNOUT)" to "Kdrv".

11. A motor system comprising:
a disk to store data;
a motor to rotate the disk; and
a motor driving device to drive the motor with three-phase sine waves,
wherein the motor driving device comprises:
an inverter which includes a plurality of high-side transistors and low-side transistors respectively coupled to a driving terminal of three phases of the motor and which applies a drive voltage to the motor based on a PWM signal;
a back EMF (electromotive force) phase detector which detects a reference voltage phase used as a phase of a back electromotive force of the motor;
a drive current phase detector which detects a reference current phase used as a phase of a drive current of the motor;
a PWM controller which receives an energization control timing synchronized with the reference voltage phase and generates the PWM signal to control the drive voltage to a sine wave shape; and
a drive voltage phase generator which determines a first phase used as the phase of the drive voltage necessary to set the phase difference between the reference voltage phase and the reference current phase to a prescribed value, and which directs the PWM controller to shift the energization control timing based on the first phase,
wherein the drive voltage phase generator comprises:
a phase arithmetic circuit which calculates a second phase used as a phase of the drive voltage to reduce the phase difference between the reference voltage phase and the reference current phase to zero substantially, based on an arithmetic expression using a current value of the drive current, an angular frequency of the motor, and a predetermined characteristic constant of the motor; and
a phase correction circuit which determines the first phase by adding a correction value to the second phase, and which inputs the reference voltage phase and the reference current phase to update the magnitude of the correction value by a feedback control so as to converge the phase difference between the reference voltage phase and the reference current phase to the prescribed value.

12. The motor system according to claim 11, wherein the prescribed value is zero.

13. The motor system according to claim 11, wherein the phase correction circuit stops updating of the correction value responding to a hold signal and holds the newest correction value.

14. The motor system according to claim 11, wherein the phase correction circuit comprises:
a multiplier which multiplies a prescribed conversion factor to one of the reference voltage phase and the reference current phase;
an error detector which calculates the phase difference between the multiplication result of the multiplier and the other one of the reference voltage phase and the reference current phase, and detects an error between the calculated phase difference and the prescribed value;
an integrator which calculates the correction value by integrating the detection result of the error detector; and
an adder which adds the correction value calculated by the integrator to the second phase.

15. The motor system according to claim 11, wherein the back EMF phase detector comprises a first selector to select a phase of the motor used as a detection target of the reference voltage phase, and
wherein the drive current phase detector comprises a second selector to select a phase of the motor used as a detection target of the reference current phase.

16. The motor system according to claim 15, wherein the back EMF phase detector further comprises a first averaging circuit, detects the reference voltage phase for every phase by switching sequentially the phase of the motor used as the detection target via the first selector, and averages the reference voltage phase detected for every phase by the first averaging circuit, and
wherein the drive current phase detector further comprises a second averaging circuit, detects the reference current phase for every phase by switching sequentially the phase of the motor used as the detection target via the second selector, and averages the reference current phase detected for every phase by the second averaging circuit.

17. The motor system according to claim 11,
wherein the inverter applies a drive voltage to the motor according to a 180-degree energization system,
wherein the back EMF phase detector detects a zero crossing point of the back electromotive force in a non-energization period which is a period smaller than 60 degrees provided in advance within the 360-degree energization period and set up in advance to stop the energization, and
wherein the drive current phase detector detects a zero crossing point of the drive current in the energization period which is different in phase by 180 degrees from the non-energization period.

18. The motor system according to claim 17,
wherein the drive current phase detector detects a period in which a voltage at the driving terminal of one of the phases of the motor makes a transition between a high-potential-side power supply voltage and a low-potential-side power supply voltage responding to the PWM signal, and detects the zero crossing point of the drive current by determining whether the low-side transistor corresponding to the one of the phases is in an ON state or in an OFF state in the detected transition period.

19. The motor system according to claim 11,
wherein the disk is a hard disk.

20. The motor driving device according to claim 1, wherein the phase correction circuit corrects a phase of the drive voltage by the correction value which is obtained by the phase arithmetic circuit by a calculation to reduce the difference of the reference voltage phase comprising a back electromotive force (EMF) voltage phase and the reference current phase.

21. The motor driving device according to claim 1, wherein the phase correction circuit corrects a phase of the drive voltage by the correction value which is obtained by a calculation to reduce the difference between the reference voltage phase and the reference current phase.

22. The motor driving device according to claim 1, wherein the phase correction circuit changes the first phase by correcting the second phase.

* * * * *